(12) United States Patent
Duncan

(10) Patent No.: US 7,120,544 B2
(45) Date of Patent: Oct. 10, 2006

(54) SOFTWARE AND METHOD FOR TURBULENT FLOW ANALYSIS

(75) Inventor: Bradley D. Duncan, Huntersville, NC (US)

(73) Assignee: Automotive Aerodynamics, Inc., Cornelius, NC (US)

( * ) Notice: Subject to any disclaimer, the term of this patent is extended or adjusted under 35 U.S.C. 154(b) by 0 days.

(21) Appl. No.: 10/939,802

(22) Filed: Sep. 13, 2004

(65) Prior Publication Data

US 2005/0114097 A1  May 26, 2005

Related U.S. Application Data

(60) Provisional application No. 60/519,101, filed on Nov. 12, 2003.

(51) Int. Cl.
*G01F 17/00* (2006.01)

(52) U.S. Cl. ...................................... 702/50
(58) Field of Classification Search .................. 702/50, 702/181
See application file for complete search history.

(56) References Cited

U.S. PATENT DOCUMENTS

| | | | |
|---|---|---|---|
| 5,568,404 A | | 10/1996 | Strumolo |
| 6,088,521 A | | 7/2000 | Strumolo et al. |
| 6,089,744 A | * | 7/2000 | Chen et al. ................ 703/2 |
| 6,209,794 B1 | * | 4/2001 | Webster et al. ............ 236/94 |

OTHER PUBLICATIONS

Bradley D. Duncan, Raja Sengupta, "Numerical Simulation and Spectral Analysis of Pressure Fluctuations in Vehicle Aerodynamic Noise Generation", Feb. 2002, Society of Automotive Engineers, Inc.

David B. Sims-Williams, Bradley D. Duncan, "The Ahmed Model Unsteady Wake: Experimental and Computational Analyses", Feb. 2003, Society of Automotive Engineers, Inc.

* cited by examiner

*Primary Examiner*—Bryan Bui
*Assistant Examiner*—Demetrius Pretlow
(74) *Attorney, Agent, or Firm*—Adams Evans P.A.

(57) ABSTRACT

A method for analyzing a turbulent fluid flow field includes the steps of: creating a mathematical model of a physical object; simulating a flow field around the model, wherein the flow field is at least partially turbulent; generating time series flow data output data representative of the flow field; and identifying repeating turbulent flow patterns in the flow data. These features are identified by selecting at least one frequency range of interest; filtering the flow data based on the frequency range; and observing coherent structure in the filtered data. The method may be implemented as a software program running on a computer.

12 Claims, 15 Drawing Sheets

SOFTWARE AND METHOD FOR TURBULENT FLOW ANALYSIS

CROSS-REFERENCE TO RELATED APPLICATIONS

This application claims the benefit of U.S. Provisional Application No. 60/519,101, Filed Nov. 12, 2003.

BACKGROUND OF THE INVENTION

This invention relates generally to computer analysis and more particularly to CFD analysis of aeroacoustic properties. Computational Fluid Dynamics (CFD) is a branch of fluid dynamics in which the physics of motion of particles of gases or liquids are simulated using computers. The physical volume of fluid and bounding surfaces are represented using a finite set of discrete elements, and mathematical equations relating the motion of particles are computed at each element. Commercial CFD software is currently used in industry for a broad range of applications, including internal flow of liquids and gases in pipes, machinery, ventilation ducts, etc., as well as external flow of air or water for application to land, air and sea vehicles.

A common thread to uses of CFD in applications is the presence of turbulence in the results. Turbulence occurs naturally in fluids as a result of the complex non-linearities in the physical relationship between inertia of moving fluid particles, and the resistance to motion provided by friction (also called viscosity or viscous force). A fluid dynamic parameter called the Reynolds number is the ratio between inertial and viscous force. Every flow configuration has a critical Reynolds number above which the flow becomes turbulent, and below which the flow is smooth and ordered, or laminar. One definition of turbulence is flow that contains a range of spatial and temporal scales extending from the largest physical scales of the problem, represented by the size of the geometry and time scale of any forcing or motion, to the smallest possible scale allowed by fluid dynamics, which is called the Komolgorov scale, and is determined by the viscosity of the fluid. In physical applications, one sees large-scale fluid dynamic variations, superimposed by "eddies" of various sizes down to the smallest measurable scale. One representation of this superposition is a spectrum, computed from the kinetic energy of the flow at a single point in space as a function of time. This spectrum shows high energy contributions at some low frequency related to the scale of the physical problem, and then a "cascade" of energy to smaller and smaller scales (higher frequencies on the spectrum), with lower and lower energy levels.

Some prior art CFD software attempts to represent turbulence in terms of its mean contribution to the flow using an aggregate "turbulence model". In these software programs, the actual turbulence phenomenon is not visible in the results, and the results typically only show the flow time-averaged over long segments of time relative to the temporal scale of turbulence. However, modern commercial software is moving toward more intensive simulations of the physical phenomena involved in fluid dynamics, and including a significant portion of the turbulent energy spectrum in the resulting data. This means that the flow data contains spatial and temporal scales extending down to the smallest scales that can be resolved using the computational model of the fluid particles, while smaller scales yet beyond that level are considered only using a mathematical average effect.

While current CFD software can produce this enormous wealth of data, tools to understand this data are lacking. In fact, the CFD software is still relatively young and improvements to the physical models are still underway to simply improve the aggregate predictions using these software tools. Meanwhile, users have available to them this turbulent data, and have interest in understanding the important flow features which have some bearing on performance of their products. Some particular areas of interest in which turbulent flow features at various scales are important are wakes, mixing, combustion, vibration and noise. Examples are the turbulent wake of an aircraft, vibration of rotating disk drives, and wind noise on an automobile. Accordingly, there is a need for software which provides analysis and visualization of turbulent CFD computational results.

BRIEF SUMMARY OF THE INVENTION

The type of analysis that is needed for CFD measurement data fits in the category called "time-series analysis," and also called "digital signal processing," and is the processing of discrete time signals to quantify the fluctuations in those signals. This analysis can include time signals corresponding to an array of spatial locations so that the time signal at one point is related to the time signal at other (probably near-by) points. An example of digital signal processing is the processing of video signals: the color at each pixel is a signal that varies with time to represent a moving image.

The inventor has discovered that repetitive or periodic flow features can be identified in a turbulent flow field, making it amenable to time-series analysis. Even though the exact same flow feature will not appear repeatedly on some interval, the flow structure occurs over and over in a similar fashion such that it can be described mathematically using periodic (repeating) functions. The energy at each point can be described as a Fourier series, which is a sum of sines and cosines in a series with increasing frequencies. The amplitude at each frequency forms an energy spectrum, and this energy spectrum is descriptive of the turbulence. This type of time-series analysis is called "spectral analysis." It is aided by a computational algorithm called the Fast Fourier Transform, or FFT, and its inverse (the inverse FFT). The FFT algorithm converts a time-series into contributions at a discrete set of frequencies, with the inverse FFT converting the result back into a time-series. Understanding the contribution at each frequency is one useful approach to quantifying the fluctuations in the original time series. For convenience in analysis, the contributions can be grouped by dividing the spectrum into frequency bands, where each band contains multiple discrete frequencies computed from the FFT. In particular, "proportional bands" are often used, in which the ratio of maximum to minimum bounds of each band is some constant factor. For example, "octave bands" use a factor of 2 and "decade bands" use a factor of 10.

The method and associated software described herein uses spectral analysis techniques to better understand turbulent flow data by dissecting it into various frequency bands. Then, visualization techniques are used to present the data to the user in order to reveal the nature of flow structures in each frequency band.

According to one preferred embodiment of the invention, a method for analyzing a turbulent fluid flow field includes the steps of creating a mathematical model of a physical object simulating a flow field which is at least partially turbulent around the model; generating time series flow data output data representative of the flow field; and identifying repeating turbulent flow patterns in the flow data. These flow patterns are identified by selecting at least one frequency range of interest; filtering the flow data based on the frequency range; and observing coherent structure in the filtered data.

According to another preferred embodiment of the invention, the flow patterns are flow patterns which cause aerodynamic noise.

According to another preferred embodiment of the invention, the step of creating the model includes storing geometric data representing at least one surface of the physical object.

According to another preferred embodiment of the invention, the surface is divided into a mesh of individual surface elements.

According to another preferred embodiment of the invention, the step of simulating the flow field includes using a computational fluid dynamics software program to generate the flow data based upon preselected flow conditions.

According to another preferred embodiment of the invention, the flow data contains a representation of time-dependent turbulent eddies.

the flow data comprises surface measurement elements and volume measurement elements, and each of the surface measurement elements represents a plurality of the surface elements.

According to another preferred embodiment of the invention, the step of identifying the repeating turbulent flow patterns further includes computing a Fourier transform of the flow data to produce frequency domain data; applying a selected filter to the frequency domain data, based on the selected frequency range; and computing the inverse Fourier transform of the frequency domain data to produce output data at a range of time values. The output data contains coherent flow structure.

According to another preferred embodiment of the invention, the repeating flow patterns are displayed in a human-readable format.

According to another preferred embodiment of the invention, the human-readable format comprises a sequence of images representing the flow data at different time values.

According to another preferred embodiment of the invention, the method steps are implemented by a software program including: a spectral analysis module for performing calculations on the flow data; a job server module adapted to maintain a list of pending calculation tasks and to forward the tasks to the spectral analysis module; and a project manager module operable to receive user commands and transmit instructions so the job server module.

According to another preferred embodiment of the invention, a system for analyzing a turbulent fluid flow field includes: means for creating a geometric model of a physical object; means for applying a mesh pattern to the model; means for creating a simulated fluid flow field around the model, at least a portion of the flow field being turbulent; means for generating flow data representative of the flow field; and means for identifying repeating turbulent flow features in the flow data. The turbulent flow features are identified by filtering the flow data based on a selected frequency range and displaying the filtered data, whereby coherent structure may be observed therein.

According to another preferred embodiment of the invention, the means for creating the geometric model includes a computer aided design software program.

According to another preferred embodiment of the invention, the means for creating the simulated flow field comprises a computational fluid dynamics software program.

According to another preferred embodiment of the invention, the means for identifying the repeating turbulent flow features includes a post-processing software program adapted to receive the flow data from the means for creating the simulated flow field.

According to another preferred embodiment of the invention, the system further includes means for displaying the periodic flow features in a human-readable format.

According to another preferred embodiment of the invention, a computer-readable medium includes program instructions executing on a computer for analyzing a fluid flow field. The program instructions perform the steps of: reading data comprising a model of a physical object; reading flow data representative of a flow field which is at least partially turbulent over the plurality of surface elements; and identifying repeating turbulent flow patterns in the flow data. The turbulent flow patterns are identified by filtering the flow data based on a selected frequency range and displaying the filtered data, whereby coherent structure may be observed therein.

According to another preferred embodiment of the invention, the model includes geometric data representing at least one surface of the physical object. The surface is divided into a plurality of individual surface elements.

According to another preferred embodiment of the invention, the flow data represents the effect of the surface on the simulated flow field.

According to another preferred embodiment of the invention, the flow data is formatted as a plurality of surface measurement elements and volume measurement elements, each of the surface measurement elements representing a plurality of the surface elements.

According to another preferred embodiment of the invention, the flow data contains a representation of time-dependent turbulent eddies.

According to another preferred embodiment of the invention, the step of identifying the repeating flow patterns includes: selecting at least one frequency range of interest; computing a Fourier transform of the flow data to produce frequency domain data; applying a selected filter to the frequency domain data, based on the selected frequency range; and computing the inverse Fourier transform of the frequency domain data to produce output data at a range of time values. The output data contains coherent flow structure.

According to another preferred embodiment of the invention, the program instructions include: a spectral analysis module for performing calculations on the flow data; a job server module adapted to maintain a list of pending calculation tasks and to forward the tasks to the spectral analysis module; and a project manager module operable to receive user commands and transmit instructions so the job server module.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
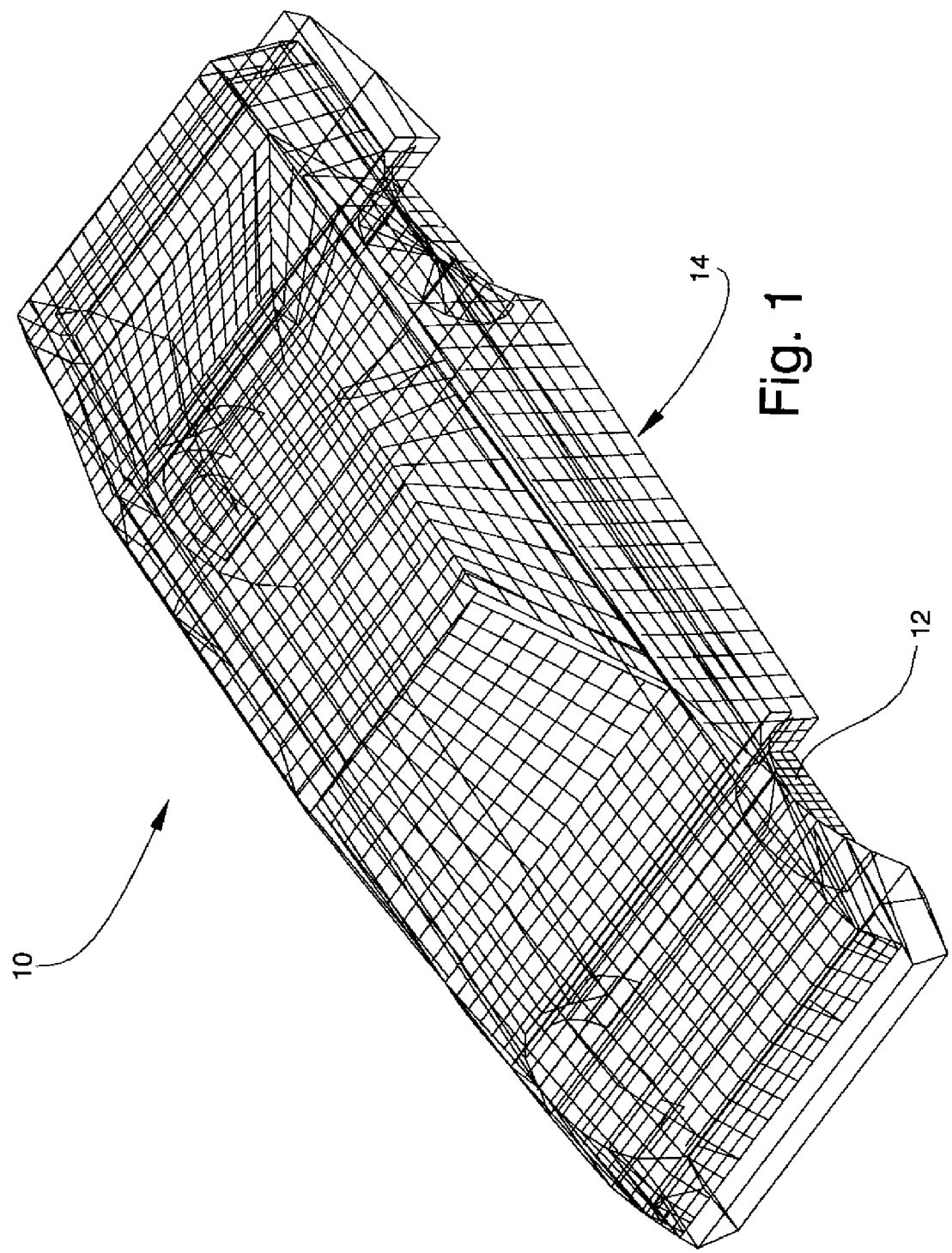
FIG. 1 is a schematic view of a computer model of a vehicle for use in CFD analysis.

FIG. 1 illustrates a computer model 10 of a vehicle for use with known CFD software. CFD simulations are performed by importing the geometry relevant to the simulation into the CFD software and setting the various options for describing the imported geometry as fixed walls, inflow/outflow regions, porous regions, etc. In this process, the volume of fluid represented by the simulation is described, as well as the surfaces of any objects around or through which the fluid will flow. User input is also required to specify how to "discretize" the fluid volume and object surfaces. Discretizing the volume replaces the continuous 3-D region of space with a finite set of small volume elements 12, each of which will be used to represent the average state of particles of fluid in that element. Depending on the CFD software, the discretization of the fluid volume may either require import of a mesh of volume elements, or specification of parameters for automatic meshing of the volume. Simple 3-D shapes such as cubes or pyramids are often used with automatic meshing schemes, while more complex curved elements are typically used with imported meshes. Similarly, discretizing the object surfaces replaces the surfaces with sets of small surface elements, typically flat polygons including triangles and arbitrary N-sided polygons. The state of surface conditions such as force and temperature are represented on each surface element. The model 10 shown in FIG. 1 depicts a mesh pattern 14 of these discrete elements 10.

CFD simulation consists of computing values at all the discrete volume and surface elements at discrete increments in time called time steps. In one time step, motion of particles from one volume element to another, as well as interactions between particles and surface elements, are used to compute the state at the next time step. A number of time steps are simulated until the flow develops from some initially-prescribed state through a transient period until it reaches a representation of the actual flow phenomena of interest. Then, the simulation is continued and data is recorded for a period of time to obtain the final results.

The user has control over how much data is captured by specifying how to average the simulation data. CFD calculations can contain tens of thousands of time steps, and the user typically desires to reduce this data into several hundred or thousand measurement frames, depending on the application, by averaging time steps together. Also, results are not typically output at each volume and surface element, but are averaged into "measurement" elements to reduce the size of the output. Each measurement element contains the data needed to compute the flow quantities of interest, such as pressure, density, temperature and velocity, and on the surface also contains the fluid forces on that surface measurement element. The fluid forces can be integrated over the surface of objects in the fluid to find the total forces and moments induced on the object by the fluid. Thus, the end result of a simulation is a set of measurement "frames", each with fluid data at each volume and surface data at each surface measurement element.

The present invention uses spectral analysis, digital signal processing, and Fourier Transforms to perform analysis of turbulent flow fields. These techniques are generally known in the art and will be briefly reviewed before describing the method of the present invention in detail.

A Fourier series represents the time series using a summation of sines and cosines preceded by complex-valued coefficients. Each "mode" of the Fourier series represents a sine/cosine pair of a particular frequency. Using complex arithmetic, this can be shown as:

$$M_k(t) = F_k e^{i 2\pi k t}, \text{ where } F_k = \text{real}(F_k) + i \text{ imag}(F_k) \text{ and}$$
$$e^{ikt} = \cos(2\pi k t) + i \sin(2\pi k t) \quad (1)$$

In addition, since a time series consists of real values (not complex ones), there is a relationship between the negative frequency modes and positive frequency nodes for any Fourier series representing a time series:

$$M_k(t) = F^*_{-k} e^{i 2\pi k t}, \text{ where } F^*_{-k} \text{ is called the complex}$$
$$\text{conjugate of } F_k \text{ and is defined by } F^*_{-k} = \text{real}$$
$$(F_k) - i \text{ imag}(F_k) \quad (2)$$

That is, $$F_k = F^*_{-k} \quad (3)$$

for a real-valued time series. The "temporal frequency", f, of any Fourier mode is directly related to its mode index, k, as well as the time increment, $\Delta t$, between elements of the time series, and the total number of elements, N. The period, P, is calculated as: $P = N\Delta t$.

The frequency, f, in units of "cycles per second", or Hertz, Hz, is calculated as:

$$f = \frac{k}{P} = \frac{k}{N\Delta t} \quad (4)$$

Using this description, a Fourier series is defined as a sum of N modes:

Fourier series:

$$\sum_{k=-N/2+1}^{N/2} M_k(t) = \sum_{k=-N/2+1}^{N/2} F_k e^{i 2\pi k t} \quad (5)$$

In this above series, N is assumed to be even, and the lower and upper limits on k are determined to produce a total of N modes (formulas for odd values of N are not shown here). A Fourier series represents a function of time, t, where the properties of this function are determined completely by the Fourier coefficients, $F_k$. For any Fourier series, it is useful to define the minimum and maximum positive frequency values, as well as the bandwidth:

$$\text{Minimum frequency,} f_{min} = \frac{1}{N\Delta t}, \text{ for } k = 1 \quad (6)$$

$$\text{Maximum frequency,} f_{max} = \frac{1}{2\Delta t}, \quad (7)$$

this is called the Nyquist frequency, for $k = \frac{N}{2}$

Bandwidth, $\Delta f$, is the difference between any two adjacent frequency values:

$$\Delta f = f_{min} = \frac{1}{N\Delta t} \quad (8)$$

A Fourier series is defined as the Fourier transform of a time series if the complex Fourier coefficients, $F_k$, are calculated from the time series values $A(t_j)$ using:

$$F_k = \sum_{j=0}^{N-1} A(t_j) e^{-i2\pi k t_j} \quad (9)$$

These coefficients can be efficiently calculated using the popular "Fast Fourier Transform" algorithm.

It is often required to represent a time series $A(t_j)$, containing N values, with a smaller number of modes, K, where K<N. The purpose of this representation is to provide a smoother, or averaged, representation of the time series. This is accomplished by simply averaging the Fourier transform over a series of "windows" of length K, from the time series. Typically, the windows are overlapped by 50% to remove certain biases in the results. This can be shown mathematically as a double summation:

$$F_k = \frac{1}{B}\sum_{b=0}^{B-1}\sum_{j=0}^{K-1} A(t_{j+bK/2}) e^{-i2\pi k t_j} \quad (10)$$

where in this summation, b is the "window number" and B is the number of windows. This summation shows that for each window the time series is shifted by b half-windows, by using the index $j+bK/2$ instead of j. The Fourier series is then represented in the same manner as described above, except that the number of modes is K rather than N:

Windowed Fourier series:

$$\sum_{k=-K/2+1}^{K/2} M_k(t) = \sum_{k=-K/2+1}^{K/2} F_k e^{i2\pi k t} \quad (11)$$

There are two additional signal-processing techniques used in conjunction with windowing. The first is called "trend removal". The simplest form of trend removal is used here, in which the mean value of each window is removed, and the mean of the entire signal is reinstated in the $F_0$ coefficient at the end of the calculation. This procedure helps to account for slow drifts in the signal that could have a detrimental effect on the Fourier coefficients. To implement trend removal, the mean of each window is calculated. The "overbar" is used to represent the mean value:

$$\overline{A_b} = \frac{1}{K}\sum_{j=0}^{K-1} A(t_{j+bK/2}) \quad (12)$$

Then the Fourier coefficients are calculated using:

$$F_k = \frac{1}{B}\sum_{b=0}^{B-1}\sum_{j=0}^{K-1} [A(t_{j+bK/2}) - \overline{A_b}] e^{-ikt_j}, \text{ for } k \neq 0 \text{ and} \quad (13)$$

$$F_0 = \frac{1}{N}\sum_{j=0}^{N-1} A(t_j), \text{ with imaginary part} = 0$$

The second signal processing technique greatly enhances the smoothing accomplished using windowing. In this method, a "window function" is used to taper the time series values down to zero at the beginning and end of each window segment. First, a window function is defined as:

$$w_j = f\left(\frac{j}{K}\right), \text{ for } j = 0, 1, 2, \ldots, K-1 \quad (15)$$

and where $f(x)$ is some continuous function defined for $0 \leq x \leq 1$, such that $f(0) = f(1) = 0$ where the values $w_j$ are called the "weight" values. Finally, employing both trend removal and window functions, the Fourier coefficients are calculated using:

$$F_k = \frac{1}{B}\sum_{b=0}^{B-1}\sum_{j=0}^{K-1} w_j [A(t_{j+bK/2}) - \overline{A_b}] e^{-i2\pi k t_j}, \text{ for } k \neq 0 \text{ and} \quad (16)$$

$$F_0 = \frac{1}{n}\sum_{j=0}^{N-1} A(t_j)$$

In practice, several common and simple window functions are used, and there are two basic categories. The first category is used primarily for "spectral estimation," in which the resulting Fourier series will be used primarily for producing a graph of amplitude of each mode vs. frequency using the power-spectral density function (see below). For this purpose, a great deal of smoothing may be used to wash out the details of the time signal and to just represent the overall frequency dependence. In technical terms, the phase information can be lost while the energy in each mode is retained. The class of window functions (described as f(x) on a range of x from 0 to 1) used for this application vary smoothly from a value of 0 at the ends (x=0 and 1) to a value of 1 at the center (x=0.5). These functions are named supposedly according to the first researcher to use them:

Bartlett (saw-tooth function): (17)

-continued $$f(x) = 1 - |2x - 1|$$

Welch (parabola): (18)

$$f(x) = 1 - |2x - 1|^2$$

Hanning (cosine): (19)

$$f(x) = \frac{1}{2}(1 - \cos(2\pi x))$$

The second class of window functions is intended to minimize smoothing while removing so-called "end effects" in the Fourier transform. End effects, also called Gibbs phenomenon, or aliasing error, occurs when there is a mismatch between the series values at the beginning and end of some of the windows. Since a Fourier series can represent only periodic functions, it produces a discontinuity between the beginning and end of the signal (if they are not matched) in order to force the signal to be periodic. This shows up as artificially high transform coefficients for the highest frequency modes. A window function alleviates the problem by tapering the ends of the window to zero, removing the mismatch. This can be accomplished with minimal smoothing by tapering to 0 only at the ends without changing the central part of the signal. In this application, one simple window function of this type is used:

End taper (trapezoidal): (20)

$$f(x) = \begin{cases} x/p, & \text{for } 0 \leq x \leq p \\ 1, & \text{for } p \leq x \leq (1-p) \\ (1-x)/p, & \text{for } (1-p) \leq x \leq 1 \end{cases}$$

Where p is a small number representing the fraction of the window to taper. For example, a 5% taper is accomplished using p=0.05. Also, the user can specify that no window function will be used, in which case the weights, $w_j$, are all set to 1.

The Fourier transform, without any smoothing, retains the total variation of the time series. The total variation of the signal is represented by its "variance", described above as the function var(A). The following identity shows how the variance is related to the Fourier transform coefficients:

$$\text{var}(A(t_j)) = \left[\sum_{k=N/2-1}^{N/2} F_k F_k^*\right] - F_0^2, \quad (21)$$

where $F_k^*$ is the complex conjugate of $F_k$

This identity is commonly called "Parseval's relation". The k=0 mode contribution is subtracted because it represents the mean value of the signal and does not contribute to the variance.

Applying window functions can reduce the variation in the resulting Fourier series representation of the time series. Thus, a scaling factor correction is applied to retain the total power identity. The scaling factor is calculated as the sum of squares of the weight values:

$$W = \frac{1}{K} \sum_{j=0}^{K-1} w_j^2 \quad (22)$$

Then the total power identity when using window functions is represented as:

$$\text{var}(A(t_j)) = \frac{1}{W} \sum_{k=K/2-1}^{K/2} F_k F_k^* \quad (23)$$

A time series can be decomposed into parts which sum to the total signal using the concept of frequency bands. A frequency band is defined using minimum and maximum positive mode indices, $k_{min}^+$ and $k_{max}^+$, where the "+" indicates the positive mode index. However, both the positive and corresponding negative modes are used together to represent the frequency band. The Fourier series for the portion of a signal belonging to a frequency band defined by indices $k_{min}^+$ and $k_{max}^+$ is:

Fourier series for a frequency band:

$$\sum_{k=k_{min}^+}^{k_{max}^+} [M_k(t) + M_{-k}(t)] = \sum_{k=k_{min}^+}^{k_{max}^+} [F_k e^{i2\pi kt} + F_{-k} e^{-i2\pi kt}] \quad (24)$$

for $k_{min}^+ > 0$

OR, if $k_{min}^+ = 0$, the Fourier series is:

$$F_0 + \sum_{k=1}^{k_{max}^+} [M_k(t) + M_{-k}(t)] = F_0 + \sum_{k=1}^{k_{max}^+} [F_k e^{i2\pi kt} + F_{-k} e^{-i2\pi kt}]$$

This formula shows that setting $k_{min}^+$ to 0 requires the Fourier series to include the mean value. Otherwise, for $k_{min}^+ > 0$, the mean value of the Fourier series will be 0.

Due to the mathematical properties of sines and cosines, the total power identity applies equally well to any frequency range. This means that the total power for the range $k_{min}^+$ to $k_{max}^+$, where $k_{min}^+ > 0$, can be calculated using:

$$\text{var}(A(t_j)), \text{ from } k_{min}^+ \text{ to } k_{max}^+ = \frac{1}{W} \sum_{k=k_{min}^+}^{k_{max}^+} [F_k F_k^* + F_{-k} F_{-k}^*] \quad (25)$$

$$= \frac{2}{W} \sum_{k=k_{min}^+}^{k_{max}^+} F_k F_k^*$$

where it has been observed that $F_k^* = F_{-k}$

The result of this calculation is the variance of a part of the signal represented by a range of frequency modes. This variance is the same as for a different time series for which the Fourier coefficients for modes outside of this frequency range are all identically zero.

The standard deviation for a frequency band is the square root of the variance, computed as above.

The concept of power also applies on a mode-by-mode basis. The statistical variance due to a single mode is typically called the "power-spectral density", psd, and is defined in such a way that it includes both the positive and negative modes:

$$psd_k = \frac{2}{W} F_k F_k^*, \text{ for } 0 < k < \frac{K}{2}, \text{ and} \quad (26)$$

$$psd_k = \frac{1}{W} F_k F_k^*, \text{ for } k = \frac{K}{2} \text{ and}$$

$$psd_0 = 0$$

when K is even.

Clearly, the total power identity can be expressed in terms of the power-spectral density:

$$\text{var}(A(t_j)) = \sum_{k=0}^{K/2} psd_k \quad (27)$$

The power-spectral density for all positive values of k is typically shown in a plot vs. frequency (k is converted to frequency, in Hz, using f=k/KΔt).

The power-spectral density for a given frequency range $k^{min+}$ to $k_{max}^+$, where $k_{min}^+>0$, can be computed to represent the statistical variance in that frequency range, as above, by totaling the power-spectral density values for each mode:

$$\text{total } psd, \text{ from } k_{min}^+ \text{ to } k_{max}^+ = \sum_{k=k_{min}^+}^{k_{max}^+} psd_k \quad (28)$$

Another useful definition of the power-spectral density for a frequency band is the mean value, rather than the total:

$$\text{mean } psd, \text{ from } k_{min}^+ \text{ to } k_{max}^+ = \frac{1}{k_{max}^+ - k_{min}^+ + 1} \sum_{k=k_{min}^+}^{k_{max}^+} psd_k \quad (29)$$

This definition is useful when overlaying plots of spectra that use different frequency band divisions—the mean psd values will overlay, while the total psd values will be shifted based on how many frequency values are combined into each band.

It is common to apply a conversion to the power-spectral density into a logarithmic scale called the decibel scale, denoted dB. In this conversion, a reference value is needed, with the same units as the original time series. If the reference value is called $A_{ref}$, the conversion to dB is computed as:

$$psd \text{ (dB)} = 10 \log_{10}\left(\frac{psd}{A_{ref}^2}\right) \quad (30)$$

The common application of this conversion is when the time series represents pressure values, p, in Pascals, Pa, as a function of time, t, in seconds. In this case, the time series can represent audible sound, if the pressure variation as a function of time, is of sufficient amplitude and in the appropriate frequency range for the human ear to perceive it as sound. The decibel scale was designed with this application in mind, and uses a reference value of pressure intended to be the lowest level of pressure variation that the human ear can perceive (in air), $A_{ref}$=0.00002 Pa, when the time series represents pressure. In this application, psd(dB) is called the sound pressure level, or SPL.

As seen above, the Fourier transform of a time series provides a convenient way to decompose the series into frequency bands, and to identify the contribution of each band to the total variance of the series. It is straight-forward to calculate the Fourier series for each frequency band as a function of time representing a portion of the original time series, that is limited in frequency range. This is also called a "band-pass filter", because the Fourier series in that range can be interpreted as a signal which has been filtered to remove any frequencies lower than $k_{min}^+$ and higher than $k_{max}^+$. The same formula is used as for the Fourier series in a frequency band.

To use the Fast Fourier transform algorithm to compute a band-pass filtered signal, first the Fourier transform coefficients, $F_k$, are computed using the Fast Fourier transform. Then, the coefficients for $k<k_{min}^+$ and $k>k_{max}^+$ are set to zero. Then, the inverse Fast Fourier transform is used to reconstruct the component of the time signal at the same time values as the original signal, i.e., $t_j$=jΔt. This process makes use of the Fast Fourier transform algorithm twice (transform, then inverse) to filter the signal.

Alternatively, the same Fourier series can be calculated at arbitrary time values rather than at the original time values. The Fourier series is re-evaluated at a sequence of arbitrary time values by summing the contributions of each mode between $k_{min}^+$ and $k_{max}^+$ using direct computation of the series. This process takes significantly longer because the inverse Fast Fourier transform is not utilized. This direct approach to band-pass filtering is called "re-sampling". Some reasons for using re-sampling rather than the inverse FFT method are to use much smaller time intervals to better show the effects of high frequency contributions smoothly, and to match comparison data points which are available at a different set of time values.

Figure 2:
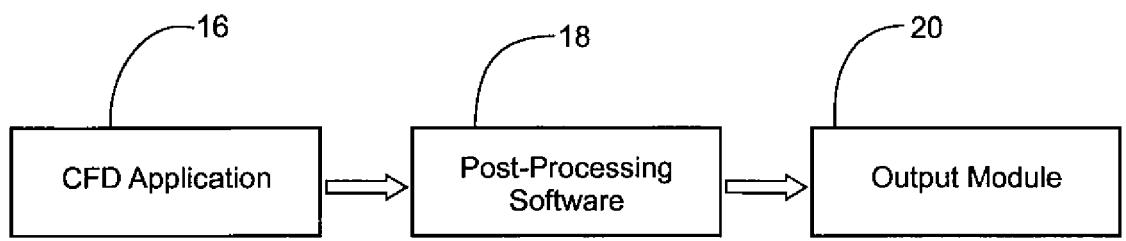
FIG. 2 is block diagram showing the overall process of analyzing CFD data in accordance with the present invention.

The analytical technique described above may be applied to a model in a number of ways. For example, the necessary calculations could be executed manually. They could also be done with a known computer spreadsheet program or with a standard mathematics software package. However, the inventor has provided a unique CFD post-processing program for performing this analysis. FIG. 2 illustrates the overall information flow through a post-processing software application representative of the present invention. A CFD application 16 of a known type is used to produce a flow simulation on a model of a physical structure, such as the computer model 10 depicted in FIG. 1. The data from the flow simulation is then passed to the post-processing software 18 in the form of a plurality of measurement frames, which are described in more detail below. The post-processing software 18 is used to process sets of measurement frames using various mathematical calculations. The post-processed results are then passed to an output module 20, which can be used to produce graphs, images and movies showing flow features represented in the data. The CFD application 16, the post-processing software 18 and the output module 20 may be separate, stand-alone software products, or they may all be incorporated into a single software package.

Figure 3:
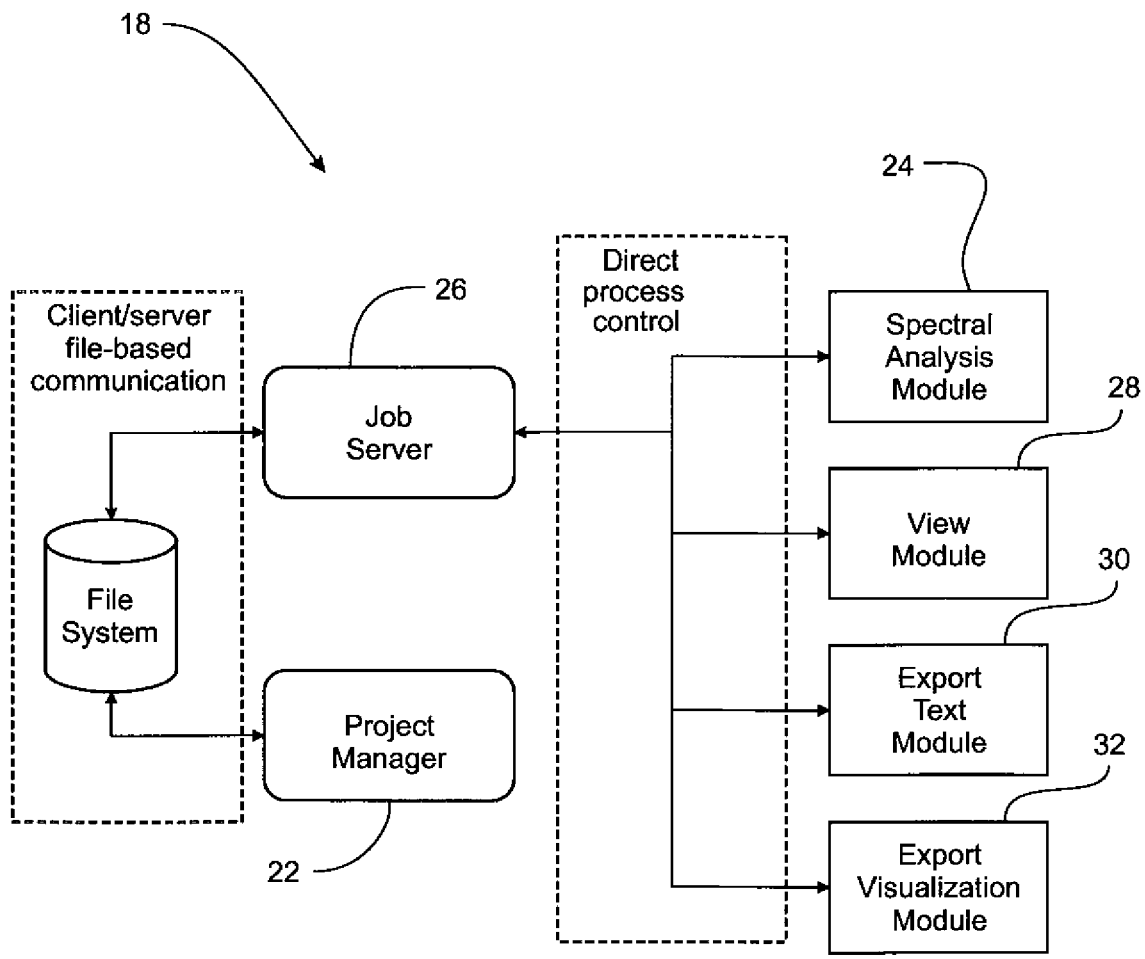
FIG. 3 is a schematic diagram showing the structure of post-processing software constructed in accordance with the present invention.

Referring now to FIG. 3, the basic components of the post-processing software 18 include a project manager 22, a spectral analyzer module 24, a job server 26, a view module 28, an export text module 30, and an export visualizer module 32. These various components may be implemented as program subroutines within a larger integrated application.

The job server 26 is a separate component in the post-processing software 18 that runs in the background alongside the project manager 22 to process jobs. The job server 26 maintains separate lists of jobs that have a status of "running," "queued," or "held." When the list of "running" jobs becomes empty, the first job in the "queued" list is transferred to the "running" list and executed. Jobs in the "held" list remain there until activated by a user input signal, at which time they are transferred to the "queued" list. The job server 26 and the project manager 22 communicate with one another by the reading and writing of signal files and job files at a specified location on a file system 34, which may be any type of data storage system. This way, the project manager 22 can display a list of running jobs, and provide user interface options for controlling which jobs are submitted and for sending signals to the job server 26. The project manager 22 and job server 26 are designed using a simple client/server model, which can be extended to move the job server 26 to a remote computer if desired.

When a job is started by the job server 26, a separate process is started by the appropriate module, each of which is a separate component of the post-processing software 18, and is started by specifying a job file with all of the user input parameters needed to perform the operation provided by the module. Calculations are performed by the spectral analyzer module 24, which is the core computational kernel of the post-processing software 18. The spectral analyzer module 24 is described in detail below. Calculation jobs can be time consuming for large input data sets, and the client/server approach facilitates the creation of a large set of calculation jobs to be performed one after the other in a job queue with no further user interaction.

The project manager 22 is the user interface component of the post-processing software 18. It may be used on various graphical computing platforms, for example Microsoft WINDOWS, LINUX and various forms of UNIX. Using the project manager 22, the user creates project files by adding measurement files to a project list, and then for each measurement file, adding calculations to perform, as well as view and export files to create. The project manager 22 delegates all the calculations, view operations, and export operations to the job server 26, which provides a job queue for processing all requests. A window in the user interface of the project manager 22 (described below) shows all jobs that are active in the job server 26.

Figure 4:
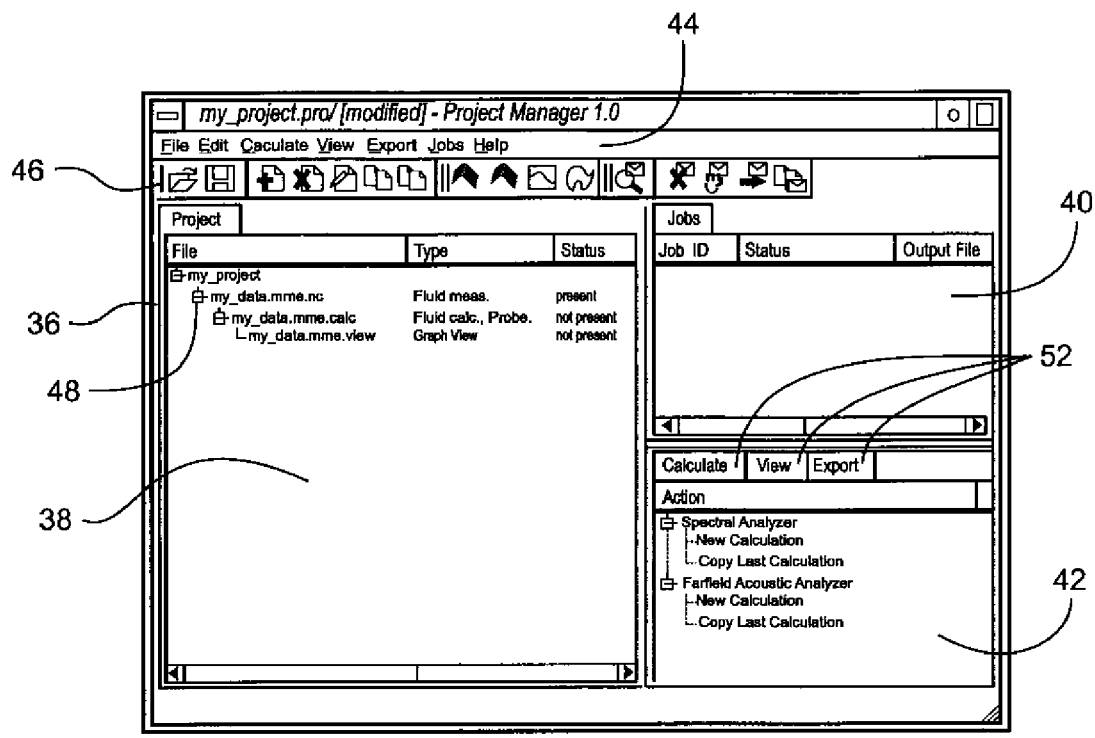
FIG. 4 shows a project manager on-screen display window.

The post-processing software user interface is enabled by running the project manager window 36. As shown in FIG. 4, this window 36 contains three sections: the project browser 38 on the left pane, the job window 40 in the upper right pane, and the module window 42 in the lower right pane. The project manager window 36 also includes a main menu 44 and a toolbar 46, with the look and feel of commonly-used, user-friendly software applications.

The project browser 38 contains a multi-column tree list display 48, showing a list of all files associated with the project in the left-most column, and additional information about each file in the other columns—the file path, type and status are shown. The files are organized in a 3-level tree. The first level is used for CFD measurement files, which are input files for calculations. The second level is shown as "branches" off the first level files, and represents calculation output files generated from each input file. The third level branches off of these calculation files, showing an additional layer of output files, which are files representing views or exported data. The user can select any file and perform operations by either right-clicking on the file using a mouse or other pointing device to produce a menu of actions related to that file, or by selecting a menu action from the main menu or toolbar. Using these menu actions, the user can add input files to the project and then specify how to run post-processing jobs that can create calculation output.

Figure 5:
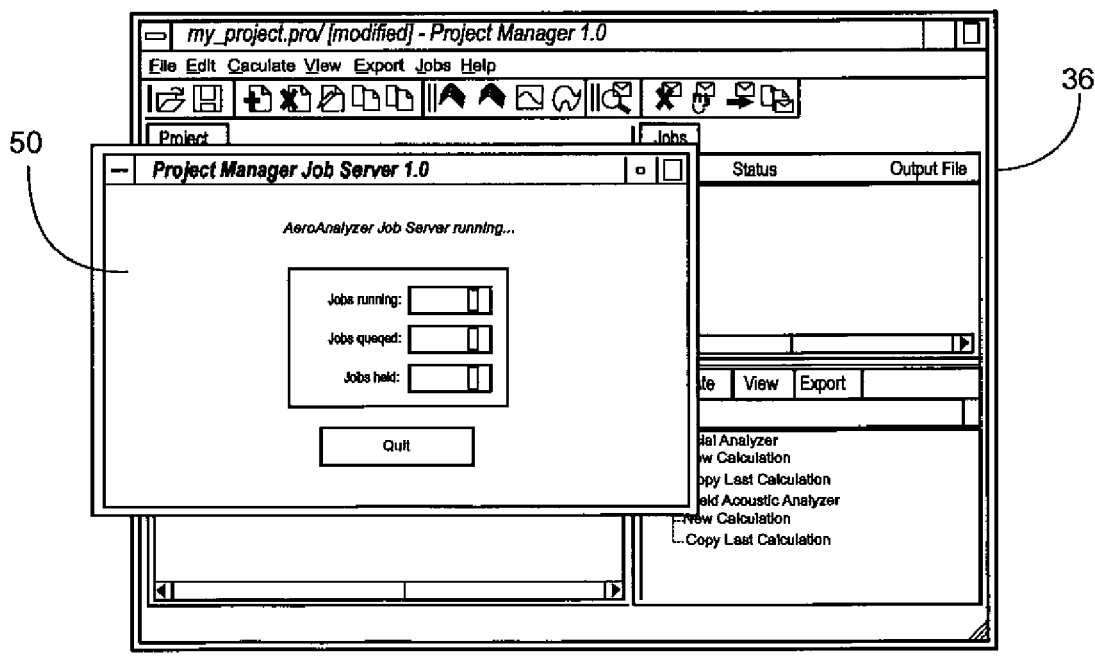
FIG. 5 shows an on-screen representation of a job server window box.

The job window 40 shows a real-time list of calculation jobs that are running on the background job server 26. The job server 26 starts whenever the project manager 22 is started, but is not closed until explicitly closed by the user, for example by hitting a "Close" button on a separate "Job Server" popup box 50, (see FIG. 5). As noted above, the job server 26 allows jobs to be run in a queue, one after the other until all are completed, without any further user intervention. Each "job" shows up as an item in the job window 40. The user can select any job and perform menu actions related to that job, for example to terminate the job or to change its status in the queue.

Figure 6:
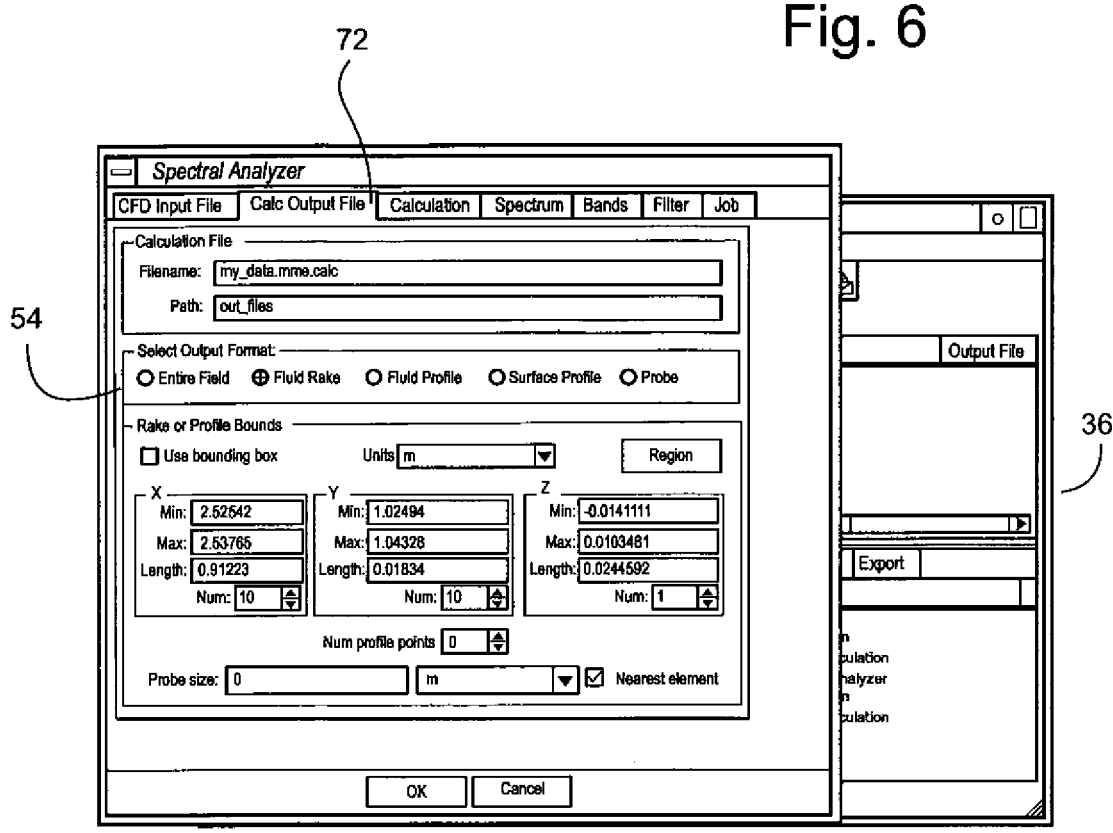
FIG. 6 shows a spectral analysis on-screen dialog box.

Finally, the module window 42 provides a convenient listing of all available post-processing tasks, divided into three categories, "Calculate", "View" and "Export", each represented by using a tab 52 in the module window 42 (see FIG. 4). Each post-processing task activates the appropriate "module", for example by double-clicking with a mouse or other pointing device on a task. The module provides a popup dialog box, with tabbed windows containing all of the needed user parameters for performing the post-processing task. FIG. 6 shows an example of such a dialog box 54 generated by the spectral analyzer module 24. Then, when the job is submitted, the appropriate module process is executed to perform the task, using the input parameter set from the dialog box, as described.

The project manager window 36 (see FIG. 4) includes the following user menus: File, Edit, Calculate, View, Export and Job. Menu actions are listed below. There are also toolbar buttons and right-click menus available, which contain the same actions as listed on the main menu. Each of the available menu actions is described individually according to the order presented to the user in the main menu, along with any dialog boxes that are activated with the action, in the following tables 1–6.

TABLE 1

Figure 7:
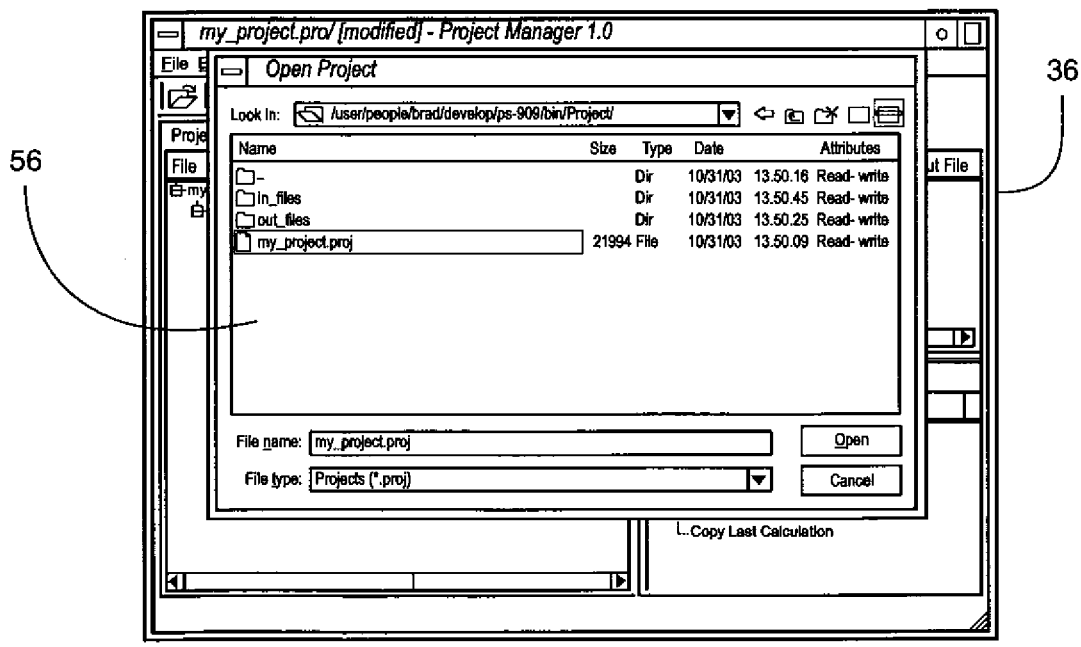
FIG. 7 shows an "open project" on-screen dialog box.

| FILE MENU COMMANDS | |
|---|---|
| Open Project | This action provides a standard file dialog box 56 (see FIG. 7) for selection of a project file, with extension ".proj". Opening a project file populates the project browser window with a tree listing of all files in the project, along with information about each file. Each element in the listing is also called a "node". It also stores in memory all of the user input parameters associated with each node. The user can view those input parameters by selecting the file and using the "Edit | Modify Parameters" menu action. |
| Close/New Project | This action closes the current project and resets the project browser window 38 to an empty list, ready for adding input files. If a modified project is already open, the user is prompted to save the project before closing. |
| Save Project | This menu action saves the current project with its current project file name. If the project was created as a new project and has not yet been given a file name, then the "Save Project As..." action is called instead. |
| Save Project | "Save Project As" opens a common file dialog to select a directory and file name for saving the |

TABLE 1-continued

FILE MENU COMMANDS

Figure 8A:
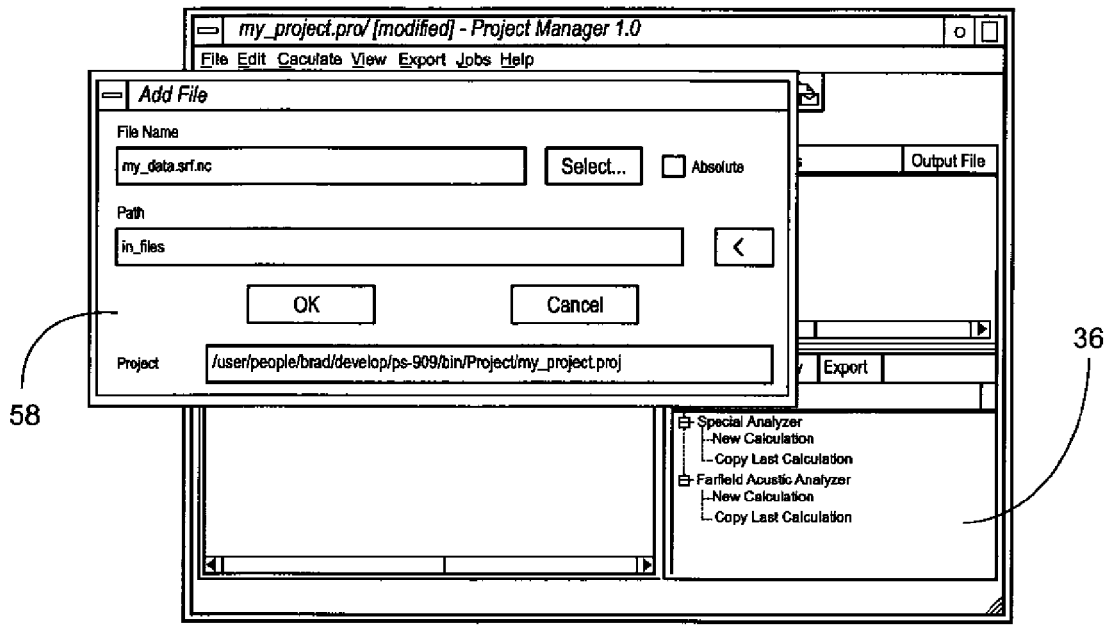
FIG. 8A shows an "add file" on-screen dialog box.
Figure 8B:
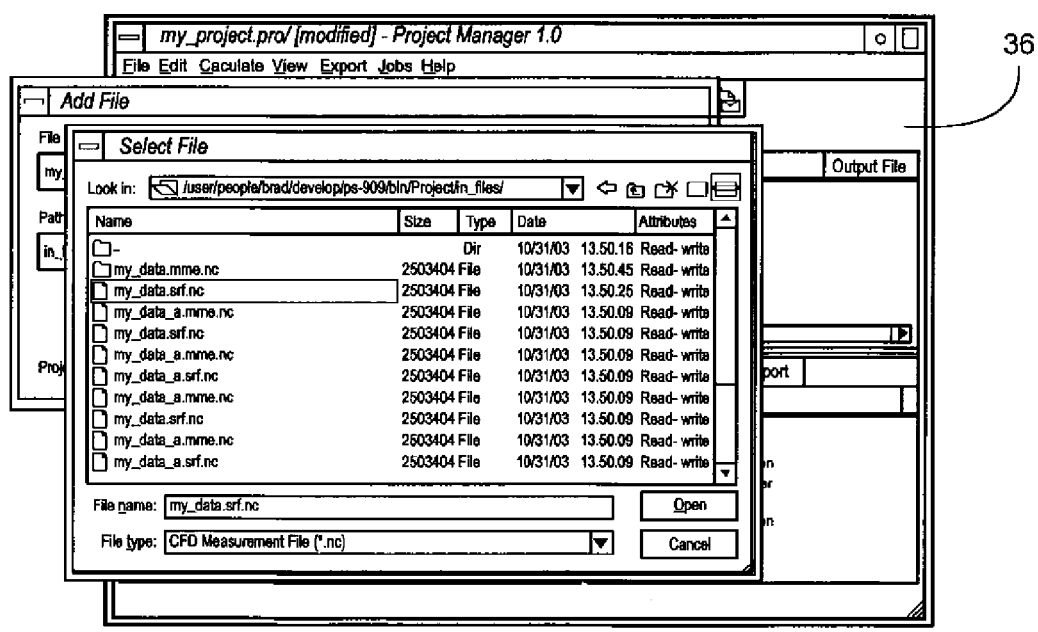
FIG. 8B shows a detail screen of the "add file" on-screen dialog box of FIG. 8A.

| | |
|---|---|
| As Add File | project file. Opens a custom "Add File" dialog 58, shown in FIG. 8A, for selection of a CFD input file to add to the project. The project browser is designed to handle user input regardless of whether the actual input files are available at the time of setting up the post-processing jobs. Therefore, the user can specify files and even directories that do not exist. Also, the user has control over the storage of the directory name of the file as an "absolute path", or as-a "relative path", relative to the directory in which the project file is stored. This allows the same project file to be used in different working directories to perform similar post-processing. The "Add File" dialog allows both the file name and the path to be typed in directly. It also contains a check-box for specifying whether the absolute or relative path should be stored. If the user checks or unchecks this box, the path field is converted appropriately to an absolute or relative path. Finally, if the user wants to select a file using a standard file dialog, the "Select" button opens a dialog box and then fills in the values of the "file name" and "path" fields when a file is selected. |
| Delete Output File | When jobs are run from user parameter sets, output files are created that correspond to the nodes listed on the project browser tree list. This menu action is used to delete the output file so that the calculation can be re-run with different parameters. |
| Exit | This action exits the project manager 22, leaving the job server running. If the project has been modified, the user is prompted to save it before closing. |

TABLE 2

EDIT MENU COMMANDS

Figure 9:
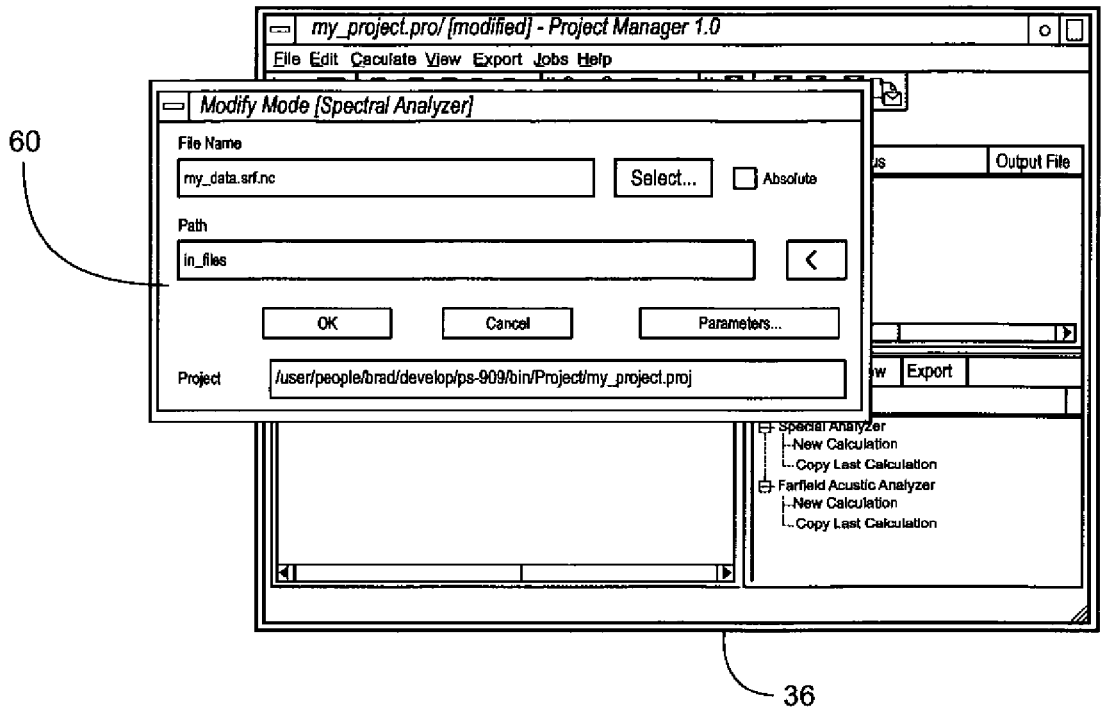
FIG. 9 shows a "modify node" on-screen dialog box.

| | |
|---|---|
| Modify Node | This action allows the user to modify the file name and path for any node on the project browser listing. It opens a dialog called the "Modify Node" dialog 60 (see FIG. 9), which is similar to the "Add File" dialog but also has a button labeled "Parameters," only when the node represents an output file and not an input file. The Parameters button allows the user to open the dialog corresponding to the Calculate, View or Export module used to create this output file. The user can then modify the parameter set describing the post-processing operation. |
| Modify Parameters | This menu action also opens the dialog for the appropriate Calculate, View or Export module. Choosing this action is the same as hitting the "Parameters" button on the "Modify Node" dialog. |
| Copy | Since each node represents either the selection of an input file, or a post-processing action on that input file, it can greatly speed up the user's work to provide copying of nodes. If the user selects a node and then the Copy action, then that node, along with any dependent higher-level nodes (called child nodes) are copied into memory where they can be retrieved using the Paste action. |
| Paste | "Paste" creates new nodes on the project browser tree using the nodes copied using the Copy action. If possible, the new nodes are created in the location currently selected by the user, and file names are automatically modified so that there are no two identical files listed in the project browser. In this way, the user can easily duplicate the entry of parameters for similar post-processing tasks. |

TABLE 2-continued

EDIT MENU COMMANDS

| | |
|---|---|
| Remove Node | This action removes the selected node, along with any child nodes. It prompts the user with a message "Are you sure you want to delete this node and any child nodes" before continuing. |
| Remove Child Nodes | This action removes only the child nodes of the currently selected nodes, after prompting the user for confirmation. This is useful for removing all of the post-processing tasks for a specific input file, while leaving the input file on the project list. |

TABLE 3

CALCULATE MENU COMMANDS

Figure 14:
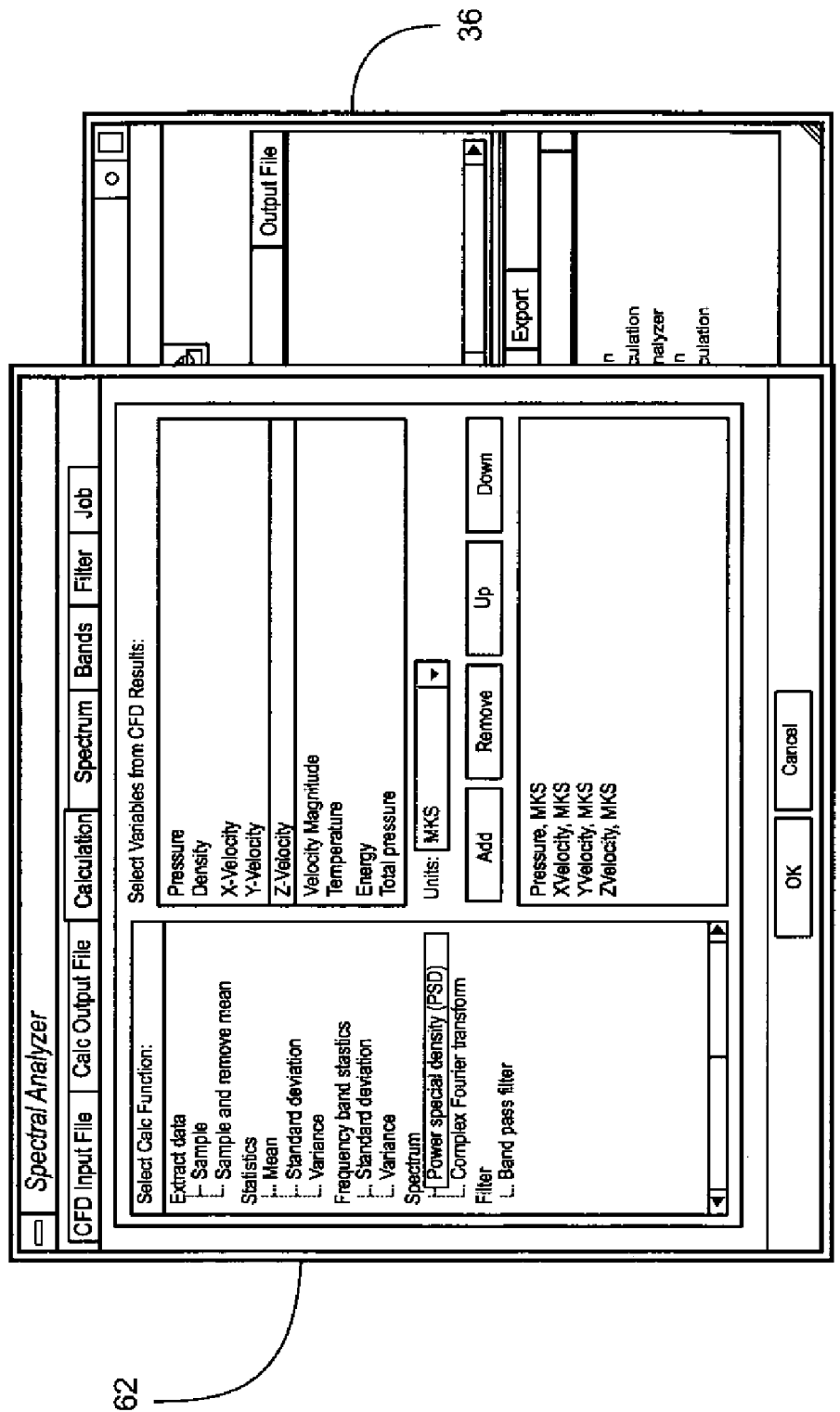
FIG. 14 shows a calculation parameters tab of a spectral analysis on-screen dialog box.

| | |
|---|---|
| Spectral Analyzer \| New Calculation | This action creates a new calculation file node, as a level 2 node under the currently selected input file (if none is selected, it simply informs the user that an input node must be selected first). Then, it opens the spectral analyzer dialog 62 (see FIG. 14). After the dialog is closed, it stores all of the user parameters in memory, associated with the node on the project tree list. |
| Spectral Analyzer \| Copy Last Calculation | Like the previous function, this action opens the spectral analyzer dialog 62. However, it first sets the default values of all fields to match the previous calculation, to speed user entry for similar post-processing tasks. |

TABLE 4

VIEW MENU COMMANDS

Figure 10:
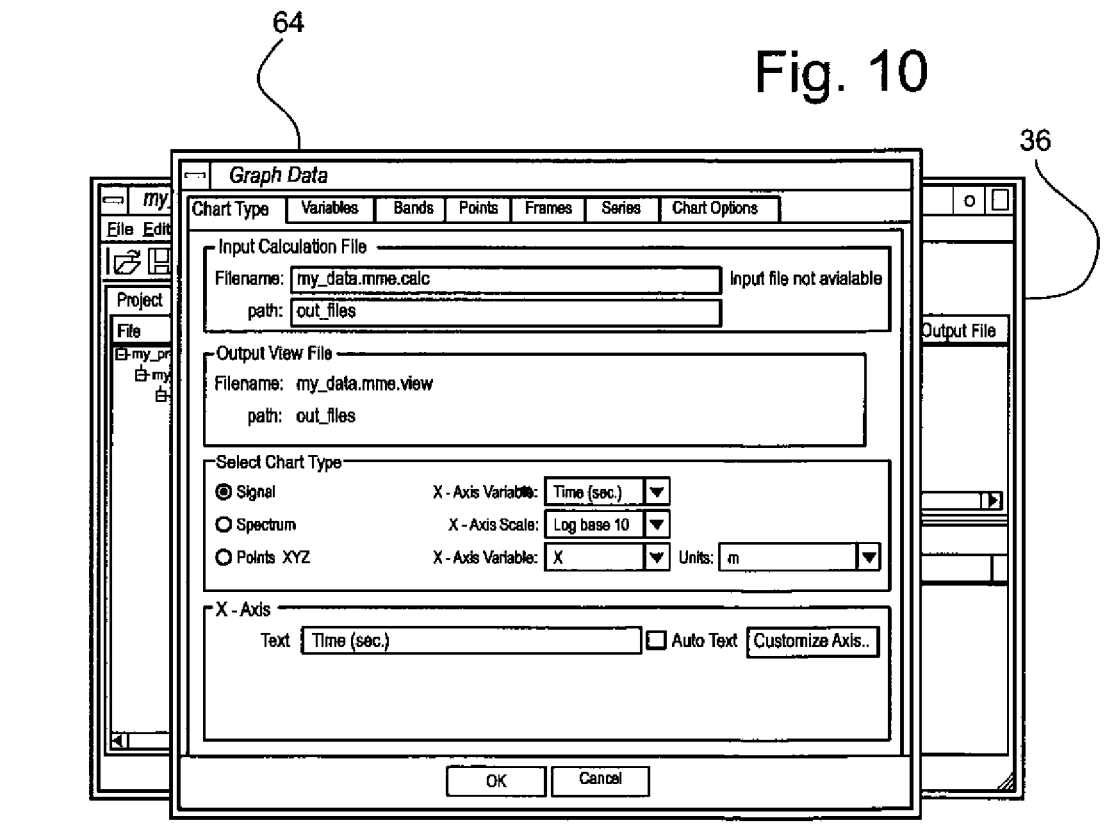
FIG. 10 shows a "view graph" module on-screen dialog box.

| | |
|---|---|
| Open Viewer | For level 3 output files created using a "View" module. A separate window can be opened to view the results using this command. A separate viewing program will be opened with options for viewing all types of "view" files created by the post-processing software 18. For example, for the "Graph Data" module, this command will actually display the graph in a window, whereas running a job with this module only creates the "view" file. |
| Graph Data \| New Graph | The "New Graph" command opens the dialog box 64 (see FIG. 10) for the "graph data" module, then stores the user parameters from the dialog in memory with the project, corresponding to a newly created level 3 node. |
| Graph Data \| Copy Last Graph | This command also opens the "graph data" module, and it first sets the default values of all fields to match the previous "Graph Data" task, to speed user entry for similar post-processing tasks. |

TABLE 5

EXPORT MENU COMMANDS

| | |
|---|---|
| Text File \| New Export File | This menu action opens a module (not shown) that can export data from a ".calc" file into a text file format for use by other applications or custom graphing. |
| Text File \| Copy Last Export | This menu action opens the same module, but fills in the parameter values using the previous invocation of this module. |
| CFD Meas. File \| New Export File | This action is used to create output from a ".calc" file for visualization. An export file that can be read by the CFD visualization software is created after the user specifies which results to visualize. |
| CFD Meas. File \| | This command also exports data for visualization, |

TABLE 5-continued

EXPORT MENU COMMANDS

| | |
|---|---|
| Copy Last Export | and uses the parameters from the last invocation of this module to speed user input. |

TABLE 6

JOB MENU COMMANDS

Figure 11:
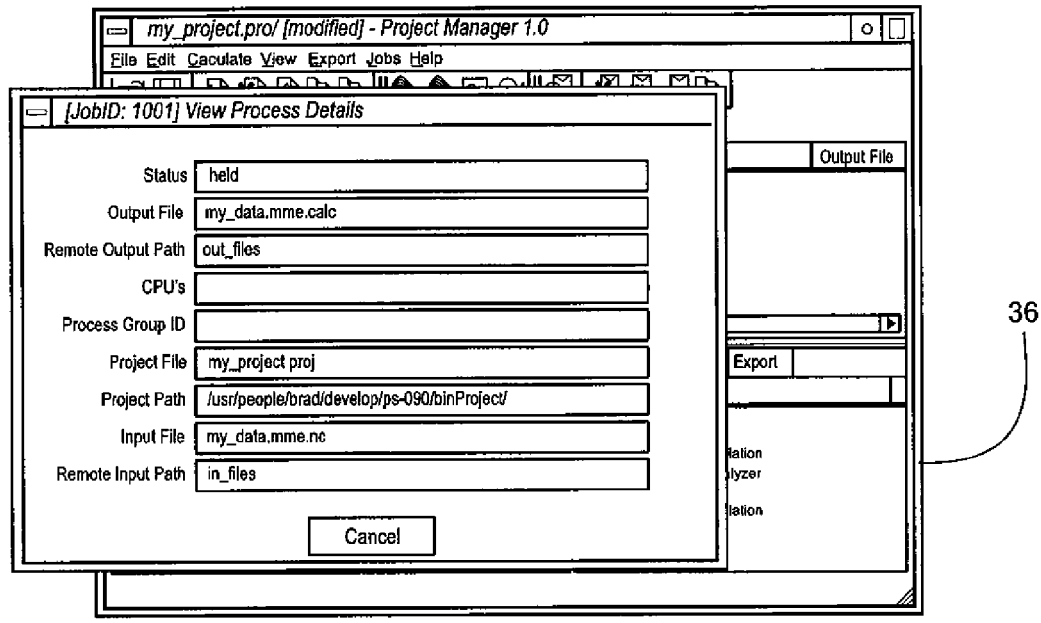
FIG. 11 shows a process details on-screen dialog box.

| | |
|---|---|
| View Log | The "View Log" command opens a scrollable text window that shows the log file for any output file. Log files are text files created when a job is executed to create an output file. It also shows the current status of a job (like "running" or "queued"). The user can view the log file for any level 2 or 3 project node, or for any job in the Job Window. |
| View Process Details | This command opens a dialog box 65 (see FIG. 11) for any selected job in the Job Window. It lists important information about the job, including the current status, process id number, and file and path names for the input file and output file. |
| Cancel | A job in the Job Window can have status of either "running", "queued", or "held". Queued jobs will run one-by-one based on "first-in-first-out" order. Held jobs will not run, but will remain in the job queue until activated by the user, using the "Jobs | Activate" command. The "Cancel" command can be used to remove any queued or held job from the job window. It can not be used to stop a running job |
| Hold | This command changes the status on any queued to job to "held". |
| Activate | This command changes the status on any held job to "queued". |
| Start Job | Current Node | This command is used to start jobs after entering parameters for a post-processing module. The node is selected on the project tree list, and then this command is used to start a job to generate the output file for that node. When the job is started, it is placed into the job queue (with status "queued"). Since the job server is running as a separate process, the job will remain in the queue until it runs, even if the originating project is closed. |
| Start Job | All Node Jobs | This command submits a batch of jobs for the currently selected node and any dependent child nodes. For each node that does not have an existing output file, a job is started to create the output file. The user is informed, in a dialog, of how many jobs were started, and then the jobs are all listed with "queued" status in the Job Window. |
| Start Job | All Jobs | This command is similar to the previous one, except that it searches the entire project tree for any output nodes for which the output file does not exist, and then it starts jobs for each of these nodes. Note that it always starts jobs for level 2 jobs before starting any dependent level 3 jobs, so the level 2 file will be available for further processing. |
| Terminate | Finally, this command can be used to stop a running job. The job is selected in the Job Window, and then the "Terminate" action is selected. After prompting for confirmation, the job is killed and removed from the job queue. |

Figure 12:
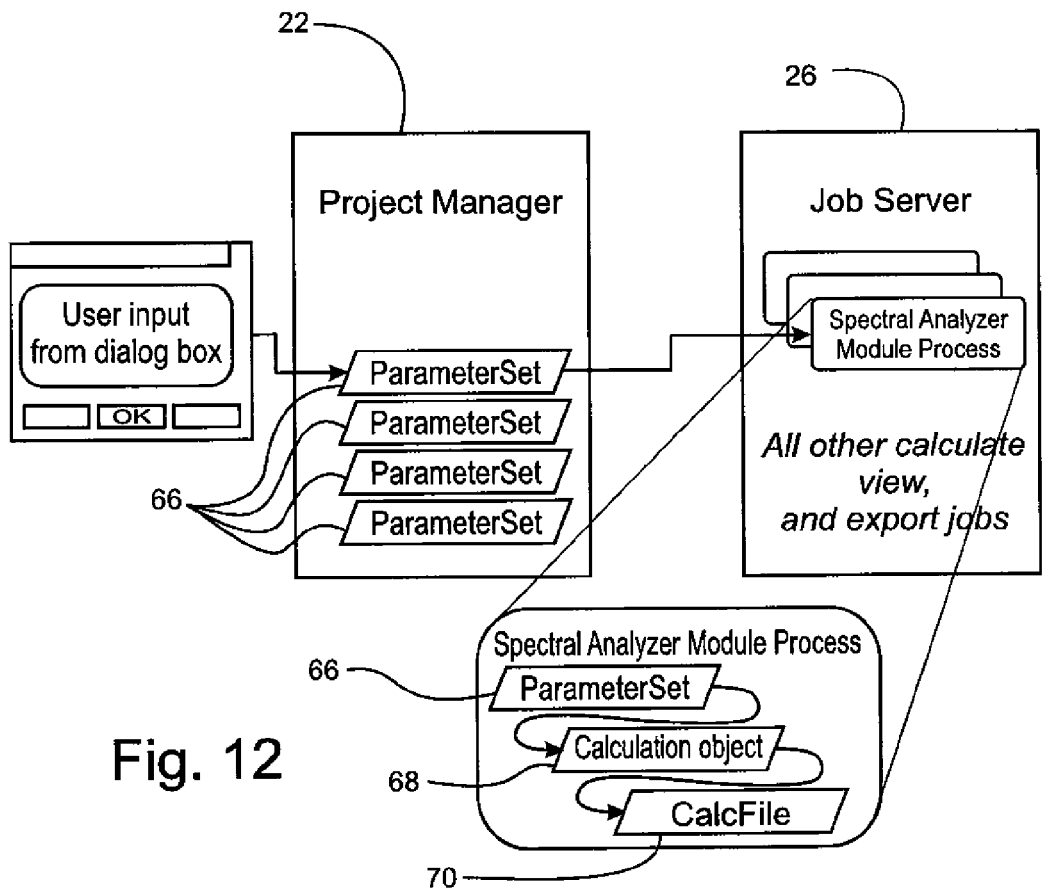
FIG. 12 is a block diagram showing the data flow from a job server and through a spectral analyzer module.

The spectral analyzer module 24 (See FIG. 3) is the technical core of the post-processing software 18. The spectral analyzer module 24 is designed using an object-oriented model, and is best described, with reference to FIG. 12, in terms of the individual concepts represented by each object and the data flow between objects. First, user input parameters are obtained through a tabbed spectral analyzer dialog box 54 (see FIG. 6) in the project manager window 36, and those user parameters are stored in a project tree as a ParameterSet object 66 until a job is submitted to the job server 26. Then, the job server 26 starts a new process for each job. For spectral analyzer jobs, the job server 26 starts the spectral analyzer module 24, passing it a file containing the ParameterSet data. The spectral analyzer module 24 process creates a calculation object 68, passing it the ParameterSet object 66, and then executing the Calculation. The Calculation performs the requested operation and produces a CalcFile object 70.

Figure 13:
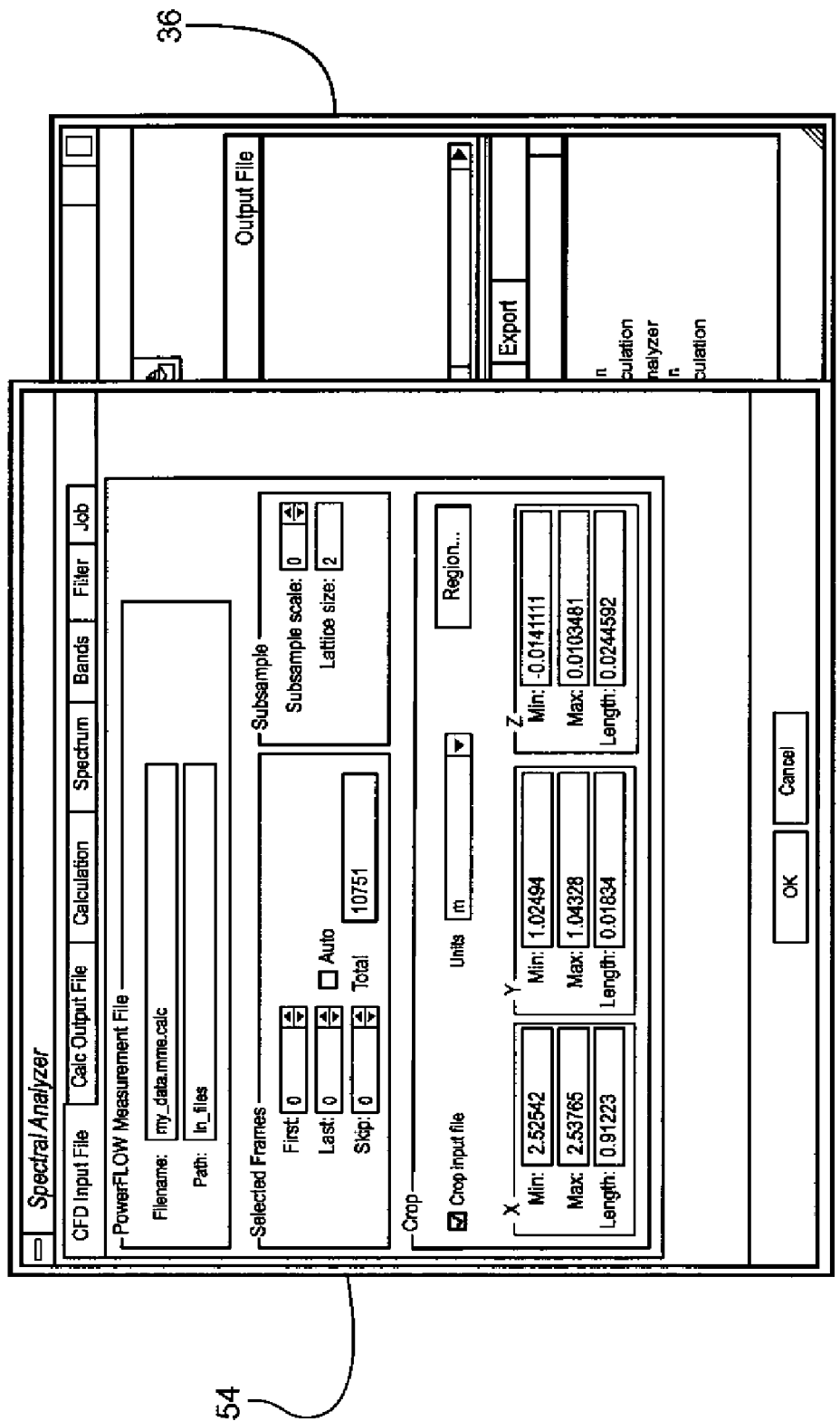
FIG. 13 shows an input tab of a spectral analysis on-screen dialog box.
Figure 15:
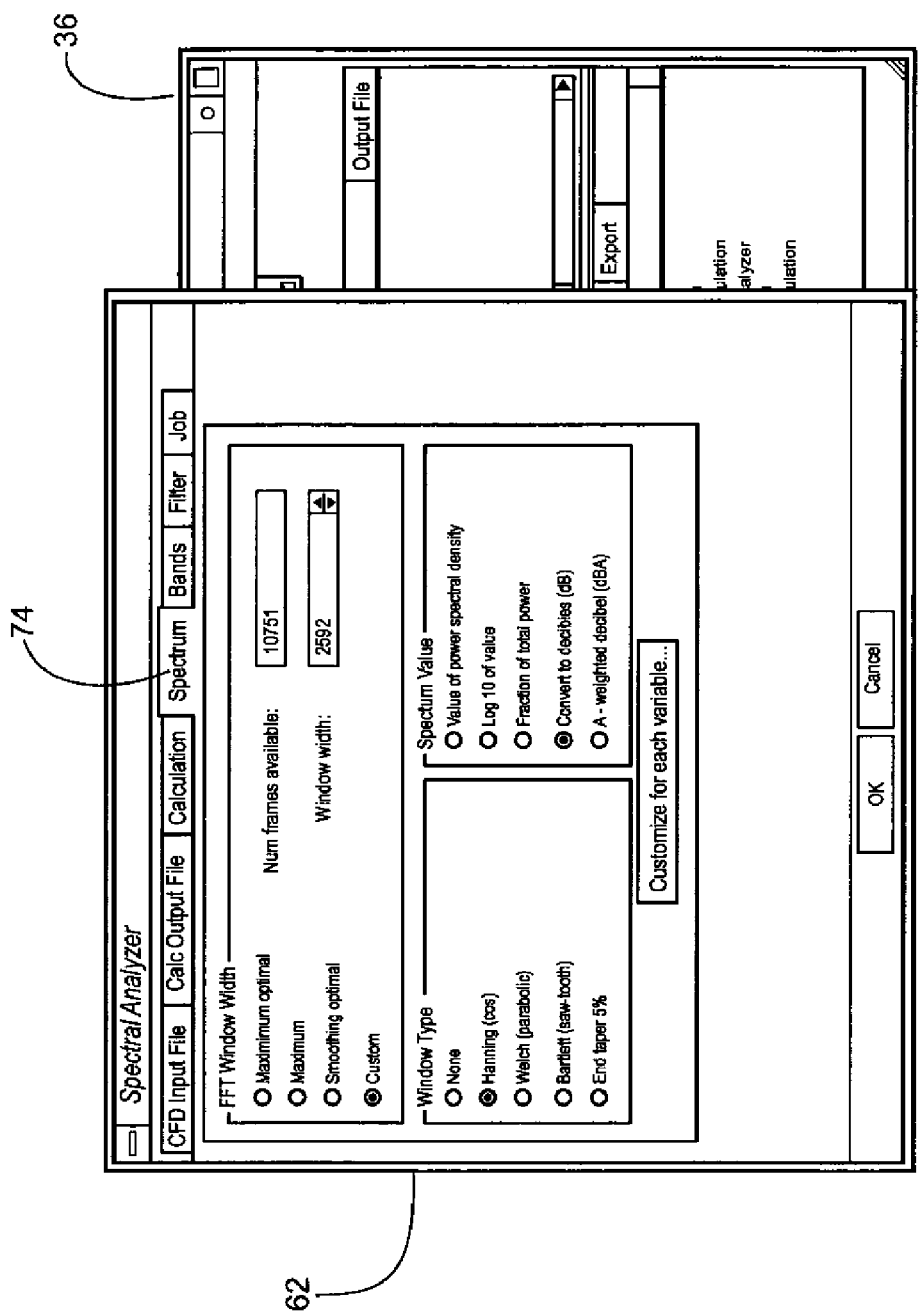
FIG. 15 shows a spectrum parameters tab of a spectral analysis on-screen dialog box.

User parameters for spectral analyzer calculations are obtained using the tabbed spectral analyzer dialog 54 (see FIG. 6) in the project manager window 36. The spectral analyzer dialog 54 contains tabs for input, calculation parameters, and volume mode output, as shown in FIGS. 13, 6, and 15, respectively. A table for surface mode output parameters (not shown) is similar to that for the volume mode output parameters. Some of the parameters require specification of units, particularly units of length. The spectral analyzer module 24 supports CFD measurement file formats which provide conversion factors to convert all units into (at least) two units systems: meter-kilogram-second (MKS) and dimensionless. The MKS units are the standard metric dimensional units, with meters used for length. Dimensionless units are problem-dependent, and the measurement file must specify conversion factors to normalize quantities by an appropriate reference value. Most of the parameters are available for both measurement files representing fluid volume elements, and for measurement files representing surface elements. However, the output file parameters tab 72 (see FIG. 6) has two different modes, one for each file type, since the type of output is slightly different for surface files than for volume files. The various input, output, and calculation parameters shown on the spectral analyzer dialog tabs are described in the following tables 7–10.

TABLE 7

INPUT PARAMETERS TAB

| | |
|---|---|
| InputFileName | The file name of the CFD measurement file to post-process. The file name and path are set by the user before the spectral analyzer dialog 54 is opened, and are shown in the spectral analyzer dialog 54 for reference. |
| InputFilePath | The directory path of the CFD measurement file. |
| InputFrameFirst | The first frame of the measurement file to use in the calculation. |
| InputFrameLast | The last frame of the measurement file to use in the calculation. |
| InputFrameSkip | Increment value when looping from first to last frame. Setting skip to 1 uses all frames between first and last, setting to 2 skips every other frame, etc. |
| InputFrameAuto | If checked, then the values for InputFrameFirst, InputFrameLast and InputFrameSkip are set to 0, the last frame available, and 1, respectively. |
| InputFrameTotal | Shows the total number of frames selected. |
| InputSubsample | Reduce the number of spatial points in the measurement file by averaging adjacent volume or surface elements together. The reduction level is specified as the Subsample value, where 0 means no reduction. |
| InputFileCrop | If checked, the measurement file region will be cropped to the box generated by the Min and Max (X, Y, Z) points (described/specified below). Measurement elements outside the cropping box will not be used. |
| InputFileCropUnits | unit of length used in specifying the Min and Max (X, Y, Z) values. The values selectable |

TABLE 7-continued

INPUT PARAMETERS TAB

| | |
|---|---|
| | are "m" (meters) and "dimless" (dimensionless). |
| InputFileXMin | X-coordinate of minimum corner of cropping box |
| InputFileXMax | X-coordinate of maximum corner of cropping box |
| InputFileXLength | XMax - XMin is shown in this field |
| InputFileYMin | Y-coordinate of minimum corner of cropping box |
| InputFileYMax | Y-coordinate of maximum corner of cropping box |
| InputFileYLength | YMax - YMin is shown in this field |
| InputFileZMin | Z-coordinate of minimum corner of cropping box |
| InputFileZMax | Z-coordinate of maximum corner of cropping box |
| InputFileZLength | ZMax - ZMin is shown in this field |

TABLE 8

FLUID VOLUME MODE OUTPUT PARAMETERS TAB

| | |
|---|---|
| OutputFileName | The file name of the calculation file to create. The file name and path are set by the user before the spectral analyzer dialog 54 is opened, and are shown in the spectral analyzer dialog 54 for reference. |
| OuputFilePath | The directory path of the calculation file to create. |
| OutputFormat | This is a parameter that determines how the selected input measurement elements will be used to create output points. The user choices are as follows: |
| | "Field": Create output points corresponding to all the selected input measurement elements. This selection is used for visualization rather than graphs, in that visualization requires values at all points. |
| | "3-D Rake": Create output points in an evenly-spaced 3-D grid arrangement, between the minimum and maximum (X, Y, Z) points specified below. This selection is used for graphs of calculated results vs. X, Y, Z, time or frequency. |
| | "Linear Rake": Create output points evenly-spaced along a line between the minimum and maximum (X, Y, Z) points specified below. Also useful for graphs. |
| | "Profile": Create output points at all measurement elements which lie on a straight line between the minimum and maximum (X, Y, Z) points specified below. Most useful for graphs vs. X, Y, Z or distance along the profile. |
| | "Probe": Create a single output point by combining all input measurement elements using a volume-weighted average. This is useful when the measurement file includes the data from only a small spatial region, and is used to make graphs of calculated results vs. time or frequency at a single point in the volume. For a measurement file with a large spatial region, "Probe" can be used in conjunction with cropping the file to a small region to extract a single output point out of the measurement file. |
| OutputRakeBoundingBox | When specifying the value of OutputFormat to be a 3-D or linear rake, this parameter may be set to "yes" to cause the post-processing software 18 to use the entire exterior bounding box of the measurement volume instead of the specified (X, Y, Z) points. Also replaces the minimum and maximum (X, Y, Z) points with the values representing the exterior bounding box. This option simplifies specification of the rake bounds by filling in the bounds of the original data. |
| OutputRakeUnits | Units of minimum and maximum (X, Y, Z) values. Choices are "m" (meters) and "dimless" (dimensionless). |
| OutputRakeXMin | X-coordinate of minimum rake point |
| OutputRakeXMax | X-coordinate of maximum rake point |
| OutputRakeXLength | XMax - XMin is shown in this field. |
| OutputRakeXNum | The number of rake points to use in the X direction for 3-D rakes. |
| OutputRakeYMin | X-coordinate of minimum rake point. |
| OutputRakeYMax | X-coordinate of maximum rake point. |
| OutputRakeYLength | XMax - XMin is shown in this field. |
| OutputRakeYNum | The number of rake points to use in the Y direction for 3-D rakes. |
| OutputRakeZMin | X-coordinate of minimum rake point. |
| OutputRakeZMax | X-coordinate of maximum rake point. |
| OutputRakeZLength | XMax - XMin is shown in this field. |

TABLE 8-continued

FLUID VOLUME MODE OUTPUT PARAMETERS TAB

| | |
|---|---|
| OutputRakeZNum | The number of rake points to use in the Z direction for 3-D rakes. |
| OutputRakeLinearNum | The number of rake points to use along a line between the minimum and maximum points for Linear rakes. |
| OutputRakeProbeSize | Distance from specified rake points within which measurement element is used, as defined by its center point. |
| OutputRakeProbeUnits | Units of probe size. Choices are "m" (meters) and "dimless" (dimensionless). |
| OutputRakeUseNearest | If this box is checked, then probe size is set to zero. |

TABLE 9

SURFACE MODE OUTPUT PARAMETERS TAB

| | |
|---|---|
| OutputFileName | The file name of the calculation file to create. The file name and path are set by the user before the spectral analyzer dialog is opened, and are shown in the dialog for reference. |
| OuputFilePath | The directory path of the calculation file to create. |
| OutputFormat | The output format is a parameter that determines how the selected input measurement surface elements will be used to create output surface points. The user choices are as follows:
"Field": Create output points corresponding to all the selected input measurement surface elements. This selection is used for surface visualization rather than graphs, in that visualization requires values at all surface points.
"2-D Rake": Create output points using a 2-D rake projected onto the surface. Each surface measurement file contains elements which represent surfaces in 3-D space. An algorithm is used to project specified rake points onto the surface. The 2-D rake is specified using the (X, Y, Z) coordinates of 3 corners of the rake region. The 3 corners define a planar parallelogram (the fourth corner is inferred from the first 3). The projection direction from the parallelogram to the surface is taken as the plus or minus normal vector to the plane of the parallelogram. The nearest surface point in either direction is used as the projected point. This selection is used for graphs of calculated results vs. X, Y, Z, time or frequency.
"Linear Rake": Same as 2-D Rake but generate points only along the diagonal of the parallelogram between points 1 and 3.
"Profile": Use corners 1, 2 and 3 to define a cutting plane, and select all surface elements cut by this plane. Output points are ordered so that graphs can be made of calculated values vs. X, Y or Z.
"Probe": Create a single output point by combining all input measurement elements using an area-weighted average. This is only useful when the measurement file includes the data from only a small surface region, and is used to make graphs of calculated results vs. time or frequency at a single point on the surface. |
| OutputRakeUnits | Units of corner 1, 2 and 3 (X, Y, Z) values. The choices are "m" (meters) or "dimless" (dimensionless). |
| OutputRakeCorner1X | X-coordinate of corner 1 |
| OutputRakeCorner1Y | Y-coordinate of corner 1 |
| OutputRakeCorner1Z | Z-coordinate of corner 1 |
| OutputRakeCorner2X | X-coordinate of corner 2 |
| OutputRakeCorner2Y | Y-coordinate of corner 2 |
| OutputRakeCorner2Z | Z-coordinate of corner 2 |
| OutputRakeCorner3X | X-coordinate of corner 3 |
| OutputRakeCorner3Y | Y-coordinate of corner 3 |
| OutputRakeCorner3 | Z-coordinate of corner 3 |
| OutputRakeSide12Num | The number of rake points to use between corners 1 and 2 for a 2-D rake. |
| OutputRakeSide23Num | The number of rake points to use between corners 2 and 3 for a 2-D rake. |
| OutputRakeLinearNum | The number of rake points to use along a line between corners 1 and 3 for a Linear rake. |
| OutputRakeProbeSize | Distance from projected surface points within which surface elements can be included in that point using an area-weighted average. If this distance is zero or smaller than the size of a measurement element, then only the nearest measurement element is used, as defined by its center point. |
| OutputRakeProbeUnits | Units of probe size. Choices are "m" (meters) and "dimless" (dimensionless). OutputRakeUseNearest: If this box is checked, then probe size is set to zero. |

TABLE 10

CALCULATION PARAMTERS

| | |
|---|---|
| CalcFunction: | One of the calculation types is selected by the user in a tree list box. The spectral analyzer module 24 performs a single calculation on the input data for each calculation file, but can record any number of variables and frequency bands in each calculation file. The categorized calculations available are as follows: |
| | *(Extract calculations)* |
| Sample: | create output signal matching input signal at each measurement point |
| Sample and remove mean: | remove mean from input signal |
| | *(Statistics calculations)* |
| Mean: | compute the mean of the signal |
| Standard deviation: | compute the standard deviation of the signal |
| Variance: | compute the variance of the signal (same as standard deviation squared) |
| | *(Frequency band statistics calculations)* |
| Standard deviation: | divide the input signal into separate signals for each frequency band, and report the standard deviation of each band |
| Variance: | same as standard deviation, but report the variance of each band. |
| | *(Spectrum Calculations)* |
| Power-spectral density (PSD): | compute the power-spectral density directly from the FFT (see formulas), and then combine values together into frequency bands and report a value for each band. |
| Complex Fourier transform: | output the real and imaginary values of the computed FFT directly. |

TABLE 10-continued

CALCULATION PARAMTERS (Filter calculations)

| | |
|---|---|
| Band-pass filter: | divide the input signal into separate signals for each frequency band, and output those signals using an inverse Fourier transform, possibly resampling the signals at specified time values |
| CalcVariables: | The fluid and surface variables stored in the input file for each measurement element are listed in the upper list box. The command buttons Add, Remove, Up and Down allow the user to build a list of variables in the lower box, and to specify the order of the variables. |
| CalcVariableUnits: | Units of fluid the surface variable to add to the lower list box. With this selection, the user can add variables in either MKS or dimensionless units to the calculation in any order. |

The spectrum analysis dialog 54 also includes a spectrum parameters tab 74 (see FIG. 15). This tab 74 is only activated for calculations in the frequency band statistics, spectrum or filter calculation categories, all of which require Fast Fourier Transforms (FFT's) in the calculation.

The post-processing software 18 utilizes "windowing". This is a known method of computing FFT's for the purpose of estimating a spectrum from a discrete number of points. In this method, the time signal is divided into smaller "windows" of specified size, each overlapping by 50%. The FFT is computed for each window separately and then averaged to smooth out random errors in the spectrum due to finite signal length. In addition, each window segment is optionally multiplied by a window function which tapers to zero at the beginning and end values, with some function with maximum value one in between. Using a window function that tapers smoothly to zero at each end greatly enhances the smoothing of the spectrum. The spectrum parameters tab 74 (see FIG. 15) includes specification of both the window width and the window function, as described in the following Table 11.

TABLE 11

SPECTRUM PARAMETERS

| | |
|---|---|
| SpectrumWindowWidthMethod: | The window width can be determined in several ways depending on user selection: |

Maximum:
If the user selects this option, a single window of width equal to the number of available frames is used. Only a single FFT is performed at each output point.
Maximum Optimal:
This option is similar to Maximum in that only a single FFT window is used. However, FFT calculations are more efficient for a window width equal to the product of small numbers, like 2, 3, 4 and 5. If Maximum Optimal is selected, the nearest smaller value than the maximum that is a product of powers of 2, 3, 4 and 5 is selected to improve the efficiency of the FFT calculation.
Smoothing Optimal:
For this option, a window width is selected which is approximately 25% of the number of available frames and is also a product of powers of 2, 3, 4 and 5. Since each window overlaps by 50%, this will produce (at least) seven overlapping windows in the calculation.
Custom:
The user can also directly specify the window width by selecting this option and filling in the window width in the SpectrumWindowWidth field.

| | |
|---|---|
| SpectrumWindowWidth: | activated when SpectrumWindowWidthMethod is set to "custom", for specifying the custom window width. |
| SpectrumFramesAvailable: | shows the number of frames available, equal to InputFrameTotal. |
| SpectrumWindowType: | This option allows selection of one of several standard window functions used for smoothing spectral calculations. The functions, w(x) are specified on the range x = [0, 1], and have a maximum value of 1. |
| None: | no window function is used. that is, the weight function is equal to 1 everywhere |
| Hanning: | cosine window function: $w(x) = 0.5*(1 + \cos(2*pi*x))$ |
| Welch: | parabolic window function: $w(x) = 1 - (2x - 1)^2$ |
| Bartlett: | saw-tooth window function:<br>$w(x) = 2x$ for $x = [0, 0.5]$<br>$w(x) = 2(1 - x)$ for $x = [0.5, 1]$ |
| End taper 5%: | trapezoidal window function:<br>$w(x) = 20x$ for $x = [0, 0.05]$<br>$w(x) = 1$ for $x = [0.05, 0.95]$<br>$w(x) = 20(1 - x)$ for $x = [0.95, 1]$ |

TABLE 11-continued

SPECTRUM PARAMETERS

SpectrumValueType: This selection is activated only for a power-spectral density calculation. The power-spectral density (PSD) is usually reported in decibels (dB), but this group allows other options for creating output starting with the raw PSD value:

Value: report the raw PSD value
Log10: report the log, base 10, of the PSD value
Fraction of total power: normalize PSD by the total power of the signal, which equals both the statistical variance, and the sum of all PSD values.
dB: convert the PSD value into decibels using dB = 10 log (PSD/ref^2), where "ref" is an appropriate reference value for the fluid variable represented in the input signal. In practice, a reference value is only needed when pressure in Pascals (MKS units) is used as the input signal, as pressure has a physical meaning in acoustics. In this case, the standard pressure reference value of 0.00002 Pa is used, as a pressure fluctuation of this amplitude is considered to be the threshold of human hearing. In all other cases, a reference value of 1 is used.
dBA: A-weighted decibels. Multiply the PSD by a standard function called the "A-contour" which is a function of frequency, and weights the PSD according to human perception of loudness (see formulas). Then convert to decibels.

The FFT includes values for a discrete set of frequencies, $f_k = k*$bandwidth (in Hertz), for $k=0, 1, 2, \ldots, K$, where $K=N/2$ if N is even and $K=(N+1)/2$ if N is odd, and where N is the window width. The bandwidth is computed from the input signal's total time interval, P, in seconds. That is, bandwidth=$1/P$. The frequency $f_0=0$ represents the mean of the signal. The frequency $f_1$ is equal to the bandwidth, $1/P$, and represents the minimum frequency that can be represented in the FFT window. The frequency $f_K$ is equal to $P/(2N)=1/(2*$time interval between frames). This is the so-called Nyquist criterion for the maximum frequency represented in a time series.

Figure 16:
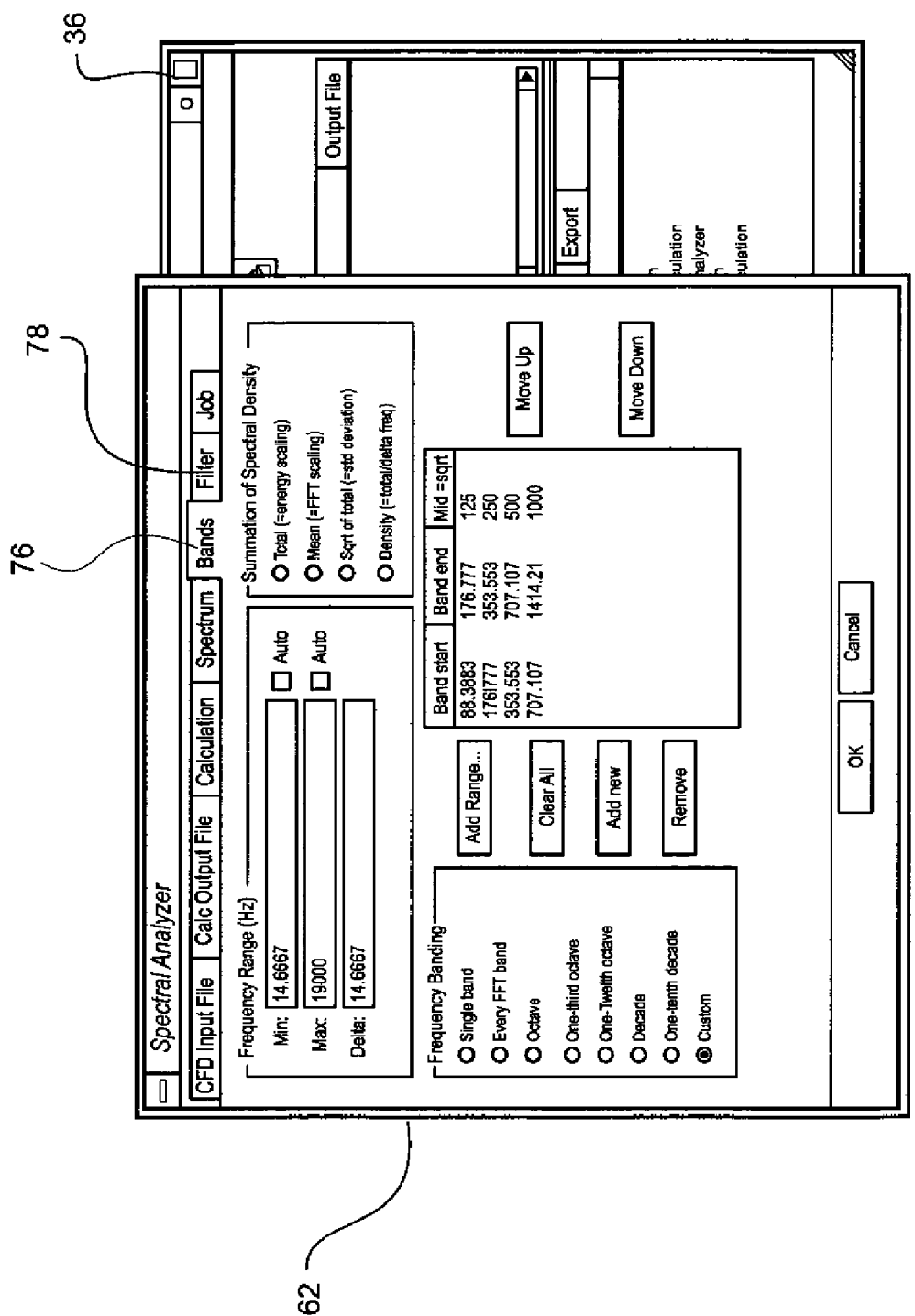
FIG. 16 shows a frequency band selection parameters tab of a spectral analysis on-screen dialog box.

The frequency band selection parameters are chosen by the user on the frequency band selection tab 76 (see FIG. 16). The parameters are as shown in the following Table 12.

TABLE 6

FREQUENCY BAND SELECTION PARAMETERS

| | |
|---|---|
| BandsFreqMin | report only frequency values higher than the specified minimum. |
| BandsFreqMinAuto | fill in the BandsFreqMin field with the $k=1$ frequency from the FFT. |
| BandsFreqMax | report only frequency values lower than the specified maximum. |
| BandsFreqMaxAuto | fill in the BandsFreqMax field with the $k=K$ frequency from the FFT. |
| BandsDeltaF | shows the bandwidth value in Hertz. |
| BandsDivisionsType | This option determines how the output is divided into frequency bands. For spectrum plots it is common to use a large number of frequencies, and combining results into coarser frequency bands is not necessary (though it can be useful). However, for visualization and other ways of viewing the data, the results must be represented using a limited number of bands. In the field of acoustics it is common to divide the frequency range into "octaves" in which the range covered by each band doubles relative to the previous band. The formula for this is: $f_{i+1} = $ alpha$*f_i$, where $f_i$ is the minimum frequency of the "i"th output band, and where alpha = 2 for octave bands. Finer divisions are obtained by dividing octaves into thirds or twelfths, using alpha = $2^{1/3}$ and alpha = $2^{1/12}$, respectively. In the present post-processing software 18, decade and one-tenth decade bands are also provided, for which alpha = 10 and alpha = $10^{1/10}$, respectively. The user choices for this option are as follows: |

TABLE 6-continued

FREQUENCY BAND SELECTION PARAMETERS

| | |
|---|---|
| Single band | Combine results from all FFT frequency bands between the specified minimum and maximum into one result. |
| Every FFT band | Report separate results for each FFT frequency band between the specified minimum and maximum values. |
| Octave | Combine FFT frequency bands into octave bands between the specified minimum and maximum values. |
| One-third octave | Combine FFT frequency bands into one-third octave bands between the specified minimum and maximum values. |
| One-twelfth octave | Combine FFT frequency bands into one-twelfth octave bands between the specified minimum and maximum values. |
| Decade: | Combine FFT frequency bands into decade bands between the specified minimum and maximum values. |
| One-tenth decade: | Combine FFT frequency bands into one-tenth decade bands between the specified minimum and maximum values. |
| Custom | Combine FFT frequency bands into arbitrary list of bands, specified using min and max values. |
| BandsCustomMinValues and BandsCustomMaxValues | The buttons Add Range, Clear All, Add New, Remove, Up and Down allow the user to create and edit a list of frequency band minimum and maximum values. Those values are stored as two vectors in the ParameterSet object. |
| BandsSummationType | This option is only activated for a power-spectral density calculation (PSD). For PSD, the value reported for each frequency band can be computed several ways: |
| Total | commonly called energy scaling, the PSD values are summed from each FFT band and reported as a total in each output band. In this method, the total PSD for the entire spectrum remains constant. |
| Mean | also called amplitude scaling, the PSD values from the FFT bands are averaged to combine them into output bands. Using this method, the shape and height of the spectrum curve will remain constant with different ways of dividing the output frequency bands. |
| Square root of total | by definition, the PSD represents the statistical variance in each FFT band, and when totaled into output bands, also represents the statistical variance in those bands. The square root of the total therefore represents the standard deviation of the signal in each band. |

Referring to Table 13 below, the filtering parameters are set in the filtering parameters tab 78 in the spectrum analysis dialog 54. This tab 78 provides options for the band-pass filter calculation. Results are produced at each frequency band by reconstructing the portion of the time signal corresponding to that band. The reconstructed flow is output at a series of time frames, and can be used for animated visualizations of the flow structure in each frequency band. However, the input signal often has many more frames than needed for animations. Accordingly, the options in this tab help the user to limit the number of output frames to the desired number.

There are two ways to calculate the reconstructed flow for each frequency band. In the first method, the frequencies outside of the desired band are set to zero and an inverse FFT is used to produce a new time series representing the filtered signal at the same time values as the original signal. Then, the desired values can be extracted from the filtered signal and written to the output file. This is the method used if the FilterResampleType option is set to "use original time values." The number of output frames can be limited by specifying First, Last and Skip values for the output frames. When the "use original time values" option is selected, the real number fields below the "Re-sample . . . " option are used to provide useful feedback about the resulting time signal. The filtered signal start time, frame time step, and number of frames, and minimum and maximum frequencies represented using those frames, are displayed as read-only fields. For reference those values are also shown for the original input signal.

On the other hand, if the user prefers to generate results at specified time values that might be different than the input time values, the "Re-sample . . . " option provides a different method of reconstructing the flow. In this method, a direct summation of the contribution of each frequency is calculated at arbitrary time levels. This method is much slower than that the previous method because it does not take advantage of the inverse Fast Fourier Transform. When this option is selected, the fields for the filtered signal start time, frame time step, and number of frames, are used as input fields to specify the selected frames. The minimum and maximum frequencies represented using the specified time values are still reported in those fields.

TABLE 13

FILTERING PARAMETERS OPTIONS TAB

| | |
|---|---|
| FilterResampleType | User selects either "Use original time values," or "Re-sample at new time values (Fourier reconstruction)." |
| FilterOriginalFirst | Specifies which frame of the input signal to use as the first frame for output. |
| FilterOriginalLast | Specifies which frame of the input signal to use as the last frame for output. |
| FilterOriginalSkip | Increment value when looping from first to last frame. |
| FilterResampleStart | If "Use original time values" is selected, this value is computed to show the time value of the first selected output frame. Otherwise, can be edited to specify an arbitrary start time. |
| FilterResampleFrameStep | If "Use original time values" is selected, this value is computed to show the time increment between selected output frames based on the specified Skip value. Otherwise, this value can be edited to specify an arbitrary time increment. |
| FilterResampleNumFrames | If "Use original time values" is selected, this value is computed to show the number of frames selected using the First, Last and Skip values. Otherwise, can be edited to specify an arbitrary number of frames |
| FilterResampleFreqMin | Shows the minimum frequency that can be represented by the selected output time values. This is calculated as FreqMin = 1/(total time represented) = 1/(FrameStep*NumFrames). |
| FilterResampleFreqMax | Shows the maximum frequency that can be represented by the selected output time values. This is calculated as FreqMax = 1/(2*FrameStep). This is the so-called Nyquist criterion. |
| FilterInputSignalStart | Shows the start time of the input signal starting at the start frame specified in the Input File tab. |
| FilterInputSignalFrameStep | Shows the time increment between input frames, using the skip value specified in the Input File tab. |
| FilterInputSignalNumFrames | Shows the total number of frames available from the Input File tab. |
| FilterInputSignalFreqMin | Shows the minimum frequency that can be represented by the input signal. Calculated as FreqMin = 1/(total time represented) = 1/(FrameStep*NumFrames). |
| FilterInputSignalFreqMax | Shows the maximum frequency that can be represented by the input signal. Calculated as FreqMax = 1/(2*FrameStep). This is the so-called Nyquist criterion. |

After the parameters described above are entered, the calculation is invoked as follows. User input parameters from the spectral analyzer dialog 54 are stored in a generic ParameterSet object, which stores a list of name-value pairs called "Attributes", each representing an input parameter. Each attribute has a name represented by an arbitrary string. For example, for the input parameter InputFrameFirst, the name "input_frame_first" is used. The value of each attribute is stored as a string, and so can represent parameters of any type. Numeric values are converted into text, like "2" or "0.01234", for storage as attributes, and vector values are converted using the format "{1, 2, 3, 4}". Yes/no values from check-boxes are stored as "true" or "false", and button selections and drop-down list selections are stored as integers starting with 0, representing the selected item. The ParameterSet object is written to a file to be used as the input file for the spectral analyzer module 24. The attribute list for each ParameterSet is also added to the project file in the project manager 22.

Within the spectral analyzer module 24, the ParameterSet object is read from the input file. Then, a Calculation object is initialized with the ParameterSet, and then executed by the module. The workflow within the Calculation object is described below with reference to FIG. 17.

The user parameters, which are set in the spectral analyzer dialog 54 and then passed to the Calculation object as a ParameterSet object, are all used by the Calculation object in the course of performing the requested calculation. Many user options are implemented in the main objects used by the Calculation, and these are described in more detail below. The process flow within the Calculation object is the same for each type of calculation, except that the first two categories of calculations, "Extract" and "Statistics", do not require the FFT, and do not use division into frequency bands. The process flow and the execution of each calculation type are described below. First, all of the needed objects are initialized, then the calculation loop is initiated. Finally, the results are written to a calculation file. A log file is written during the calculation process to provide information to the user about the calculation that was performed. It also records the "percent completed" as the calculation progresses.

First, at block 99 the CFD measurement file specified by the InputFileName and InputFilePath parameters is opened by creating a MeasFile object 100 and calling the "open" operation for that object. This object handles the user options for setting the desired input frames using First, Last and Skip values. Each measurement element in the file is represented by a point number, which is an integer from 0 to the total number of points, minus 1. The MeasFile object provides data for the Calculation object using the concept of a time series, represented by the TimeSeries object. This object contains a vector of values representing a time signal at a single measurement point, and the additional data members, StartTime, FrameStep and NumFrames which allow computation of the time value in seconds for each frame. The TimeSeries object is the basic data structure used by the Calculation both for input from the measurement file and for performing the calculation. The MeasFile object provides an operation called "getTimeSeries" which requires the point number as an argument, as well as an object representing which fluid or surface variable is desired, and returns a TimeSeries object with the time signal for that variable at the specified point. Since CFD results are stored "frame-by-frame" in measurement files, reading a complete time series out of a measurement file requires reading the entire file. To make this more efficient, the MeasFile object buffers raw data from a large number of measurement points in memory, so that most calls to "getTimeSeries" will be performed without need for reading the measurement file, assuming that points are read in order.

Next, the output points are determined. The Calculation object does not use the MeasFile object directly. Instead of working with "input" points from the measurement file, the calculation only needs time signals for each "output" point based on the user options for crop, subsample and output format in the spectral analyzer dialog 54. The crop and subsample options reduce the number of points in the measurement field. The output format determines whether a rake of points, a profile, or the entire field will be used. All of these options are handled by the OutputFormat object 110, which is described below. This object is created and passed the MeasFile object 100. Then, the OutputFormat object 110 provides the "numOutputPoints" function as well as a "getTimeSeries" function that operates exactly like the MeasFile function of the same name, but returns a TimeSeries for each output point to be included in the calculation. It also requires specification of the fluid or surface variable.

For the three calculation categories that require FFT's, "Band Statistics," "Spectrum," and "Filter," the FFTCalculator and FreqBands objects 112 and 114 are created according to the user options, as described below. The FFTCalculator determines the number of frequencies that will be used in the FFT, based on the user specification of the FFT window, and this value is available using the "numModes" function. After creation, the FFTCalculator object provides the "transform" operation which takes a TimeSeries object as a parameter. The FFT transform function converts a time series, which is a set of real values, into an array of complex values that is a function of the frequency index, k (also called the mode number) rather than time. After the "transform" operation has been called in the calculation, the results needed for the calculation are readily available using the functions provided by FFTCalculator. These are summarized in the following Table 14.

TABLE 14

FFTCALCULATOR FUNCTIONS

| | |
|---|---|
| "getPSD", argument integer k | returns the PSD at the given frequency, represented by index k. |
| "getFT", argument integer k | returns a complex number representing the Fourier transform at the given frequency. |
| "getTotalPSD", two integer arguments, $k_{min}$ and $k_{max}$ | returns the power-spectral density summed over the frequencies from $k_{min}$ to (and including) $k_{max}$. |
| "invert", two integer arguments, $k_{min}$ and $k_{max}$ | returns a TimeSeries which contains the inverse FFT obtained by including only frequencies from $k_{min}$ to (and including) $k_{max}$, but with all others set to zero. |
| "evaluateInverse", one real number argument, t, representing a time value, and two integer arguments, $k_{min}$ and $k_{max}$ | returns a single value which is the inverse Fourier transform evaluated only at the specified time value, and including only frequencies from $k_{min}$ to (and including) $k_{max}$. |

Once the FFTCalculator object 112 is created, the number of frequencies used in the FFT is known. This value, along with user parameters specifying how to divide the frequency range, is used to create a FreqBands object 114. This object simply provides three functions which allow looping through the selected frequency bands, which are as follows: "numBands": returns the number of frequency bands selected by the user; "getModeStart", argument is the band index, from 0 to numBands, minus 1, returns the frequency index, k, for the first FFT frequency which is included in the specified band; and "getModeEnd", argument is the band index, from 0 to numBands, minus 1, returns the frequency index, k, for the last FFT frequency which is included in the specified band.

For all calculation types, the final object to be created in the initialization phase is the CalcBuffer 116. This object creates a temporary output file that stores results as a set of TimeSeries arrays. The TimeSeries are indexed by three indices in the CalcBuffer object 116: point number, variable number, and frequency band number. As each TimeSeries is processed in the calculation, the result is written into the CalcBuffer object 116, which then stores it in the temporary output file, rather than in memory. For calculations that produce a single value from a TimeSeries (like the power-spectral density), an output TimeSeries is still used, with only a single frame.

Figure 17:
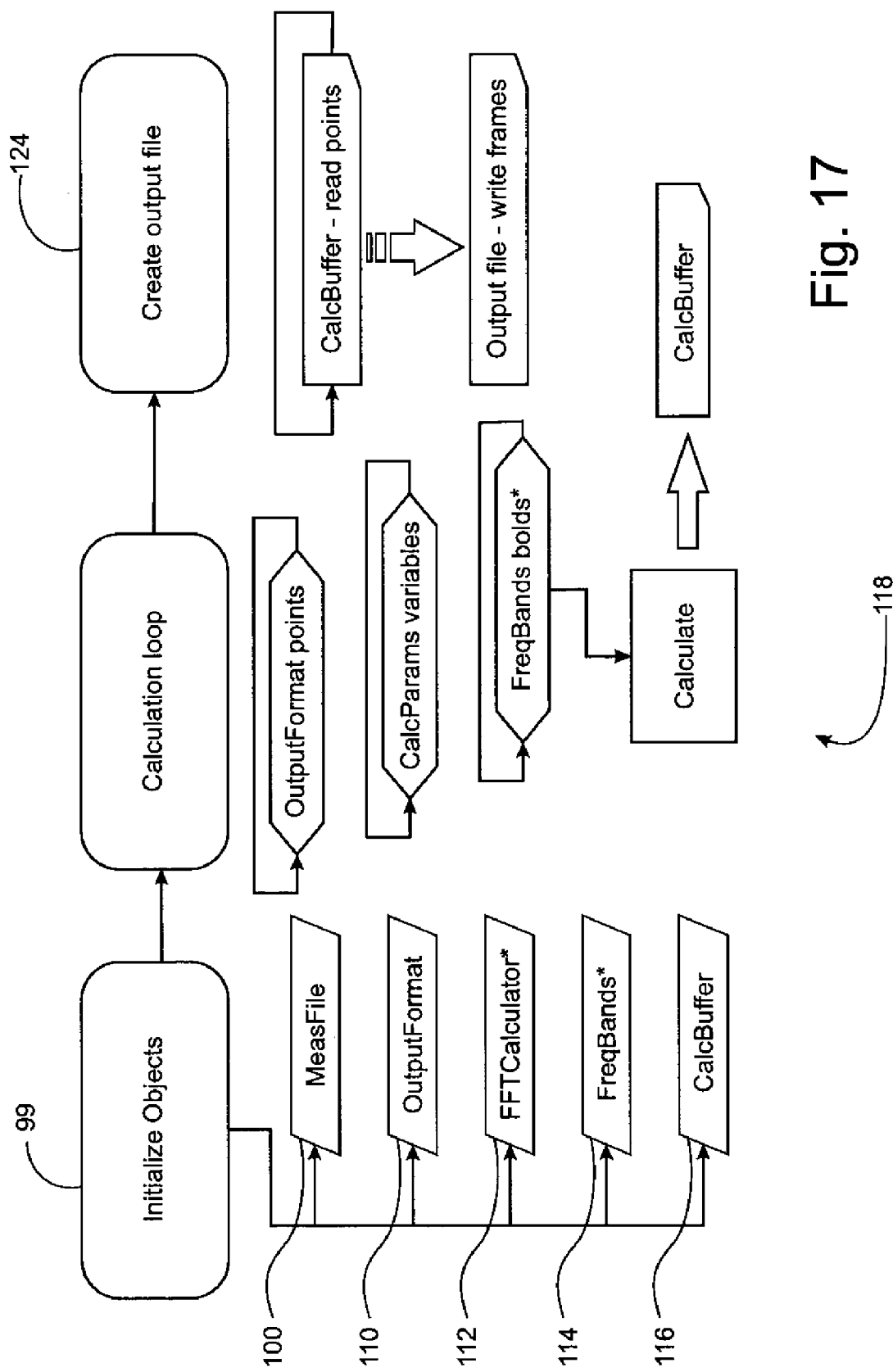
FIG. 17 is a block diagram showing the work flow through a calculation object.
Figure 18:
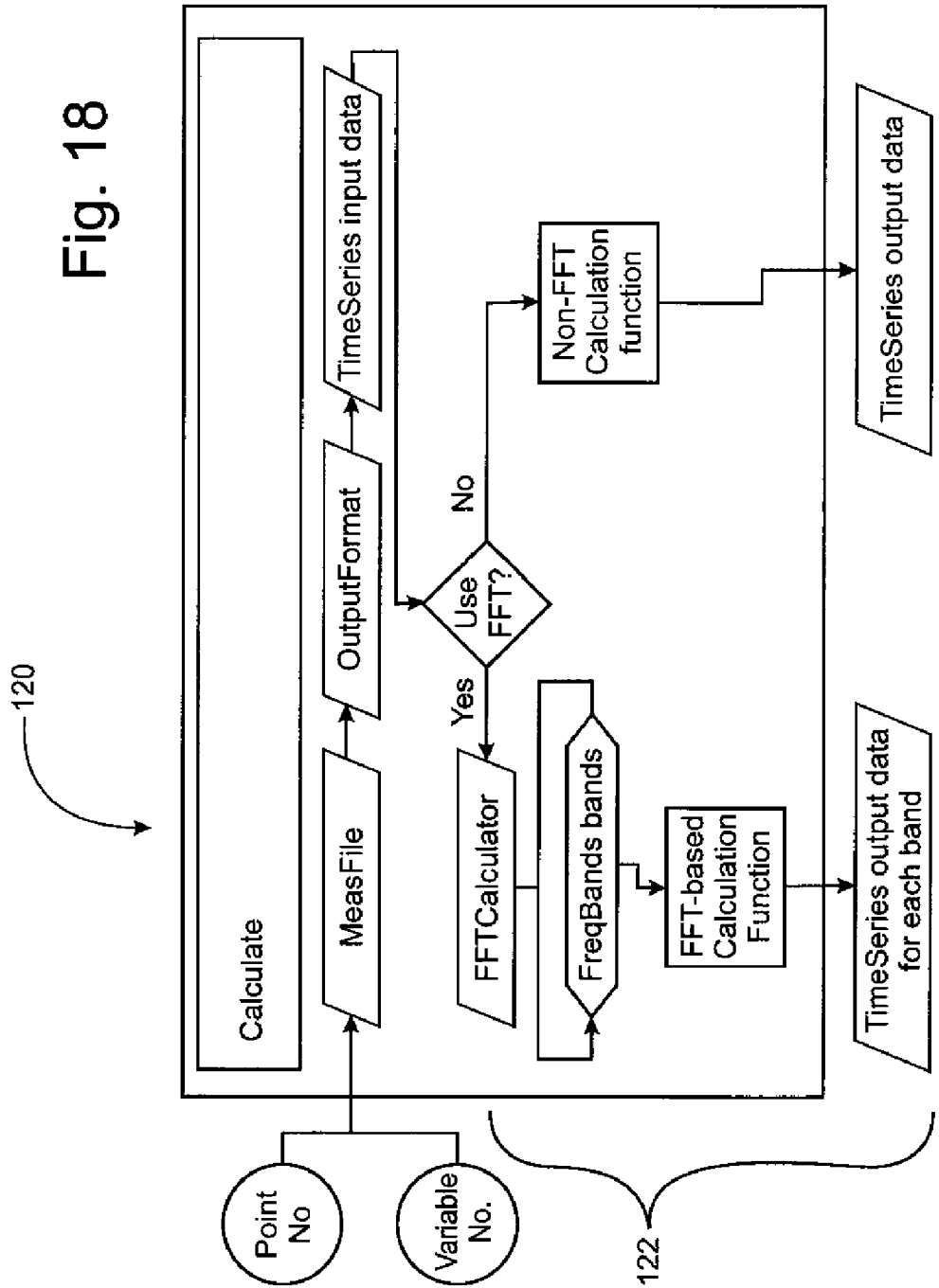
FIG. 18 is a block diagram showing a main software calculation loop.

After initialization, the calculation proceeds using a main loop 118 with two levels. The calculation is illustrated in FIGS. 17 and 18. The OutputFormat object 110 is used to define the outer loop through all of the output points. The "numOutputPoints" function provides the number of points, and the point index is used to obtain the TimeSeries for each point. In the spectral analyzer dialog 54, the user selects any number of fluid or surface variables to use for the calculation. The second-level loop in the calculation loops through all the selected variables, using a variable index starting at 0. Since the MeasFile stores raw data from the measurement file, any number of variables can be obtained at a given point with only a single read operation. Inside the second-level loop, the call to "getTimeSeries" produces the time series for each output point and input variable. The calculation flow splits according to calculation category at this point in the execution. For the extract and statistics calculation categories, the result is computed directly from the time series. For the other calculation categories, a third loop is needed through the selected frequency bands. Each calculation category is described below.

The two extract functions are "Sample" and "Sample and remove mean." For the former, the TimeSeries object read from the OutputFormat object 110 is written directly into the CalcBuffer object for the current output point and variable index (the frequency band index is set to 0). This is the simplest calculation and helps to illustrate the basic data flow for the other more complicated calculations—basically each calculation converts an input signal, obtained from OutputFormat, to an output signal, written to CalcBuffer. For the "Sample and remove mean" function, the mean value of the input signal is computed. The output signal is then computed as the input signal, minus the mean value.

The three statistics functions are "mean," "standard deviation," and "variance." These three functions are also extremely simple. The input time signal is used to produce a single value representing the requested statistical value according to the formulas described above. An output signal comprised of a single frame is created using the result, and this is written to the CalcBuffer for each output point and variable (again, the frequency band index is set to 0).

For the remaining calculation categories, the Fourier transform of the TimeSeries for each output point and variable is needed. Inside the main loop, the FFTCalculator "transform" function is called on the current TimeSeries. Then, the third-level, innermost loop 122 iterates through the selected frequency bands, from band index 0 to the total number of bands provided by the FreqBands object, minus 1. For each band, the minimum and maximum frequencies, $k_{min}$ and $k_{max}$, for that band are obtained from FreqBands using the "getModeStart" and "getModeEnd" functions. All of the FFT-based calculation functions use the functions provided by FFTCalculator to compute the results, so little actual computation is done within the Calculation object.

The band statistics category provides the "standard deviation" and "variance" calculations for each frequency band. The variance of a signal is the mean-squared deviation of the signal from its mean value, and the standard deviation is the square root of the variance. Similarly, the variance of a time series between a minimum and maximum frequency is defined as the variance of the inverse Fourier transform, with frequencies outside the specified minimum and maximum set to zero. Due to the definition of the power-spectral density, the variance of any single frequency value is identical to the power-spectral density at that frequency. Furthermore, the variance for a sum of frequency components is also equal to the sum of the power-spectral densities (see formulas). Thus, for the band statistics category, the power-spectral density is obtained using the getTotalPSD function of the FFTCalculator. For "variance," this value is reported as the result, and for the "standard deviation," the square root of this value is used. Thus, the "variance" calculation is identical to the "Power-spectral density" function in the "Spectrum" category, if the user selects to report the spectrum with the right options (using energy scaling, not converted to dB).

The spectrum functions category includes two options: "Power-spectral density (PSD)", and "Complex Fourier transform." For the PSD function, first the total value of PSD is computed using the getTotalPSD function of the FFTCalculator, specifying the current frequency band's minimum and maximum frequencies. The user has three options for how to total the PSD across the range of frequencies in each frequency band, based on the parameter BandsSummationType. When this parameter is set to "Total", the PSD is the value reported by getTotalPSD. When set to "Mean", this value is divided by the number of frequencies in the band, $k_{max}-k_{min}+1$. When set to "Square root of total," the square root of the total value is computed. For all three options, the result is considered as the "band PSD value".

Then, depending on the choice of SpectrumValueType, the final result is computed from the band PSD value as follows (except for the A-weighted decibels option-see below). Value: report the band PSD value. Log10: report the log, base 10, of the band PSD value. Fraction of total power (only valid for BandsSummationType equal "Total"): the total band PSD value is divided by the total variance of the signal. dB (only valid for BandsSummationType equal "Total" or "Mean"): the band PSD value is converted to dB using dB=10 log (PSD/ref$^2$). The correct reference value is passed to the Calculation object as an attribute in the ParameterSet object (though not available as a user parameter).

If the output is requested in A-weighted decibels, then the PSD for each individual frequency is obtained using getPSD, and then multiplied by a weight value from the so-called A-weighting function, which is available in tabular form from the ISO (International Standards Organization). This function weights each frequency in the human audible range according to perceived loudness. Then, the final result is reported as the sum of the A-weighted values. The BandsSummationType parameter is ignored for A-weighted decibels.

The second calculation function in the Spectrum category is "Complex Fourier transform". For this function, the user will typically not combine individual frequency bands into larger bands (i.e., BandsDivisionsType will be set to "Every FFT band,") and the complex Fourier transform value obtained from the "getFT" function of FFTCalculator for each frequency is written to a TimeSeries object by setting the number of frames to 2, setting the first frame to the real part of the complex Fourier transform value, and setting the second frame to the imaginary part. If the user does not select "Every FFT band" for BandsDivisionsType, the complex Fourier transform will be averaged across the band, though this has limited significance mathematically.

The filter calculation category contains a single function, "band-pass filter." This function produces an output time signal consisting of the number of frames specified by the user in the "Filter" tab of the spectral analyzer dialog 62, and utilizes either the "invert" or "evaluateInverse" function of the FFTCalculator, both of which take the frequency band minimum and maximum as function arguments.

If the user selects "Use original time values" (in parameter FilterResampleType), the inverse FFT (the "invert" function) is used to produce a time signal at every frame. But the user can limit the number of frames output in the results by selecting First, Last and Skip values. These values are used to extract the specified number of frames from the inverse Fourier transform into a new TimeSeries object, which is then written to the CalcBuffer.

On the other hand, if the user selects "Re-sample", then the entire inverse FFT is not used. Instead, a loop iterates through each selected time value (time starts at specified start value, then increments by frame step for the specified number of frames). For each time value, "evaluateInverse" is called and the value is stored in a TimeSeries object. When all the values are computed, the TimeSeries is written to the CalcBuffer. Since each call to evaluateInverse can be a sum of many frequency values, this calculation takes significantly longer than the previous method, but provides more flexibility to the user to produce results at particular time values.

After the main calculation loop, the final step is to create the output file (see block 124). This is done by first initializing a CalcFile object. This object can read and write to a binary file, and so can be used by the other modules in the post-processing software 18 to read the calculation files created with the spectral analyzer module 24. The file contains the following information: a file header indicating the file type and version (version numbers can be used to provide backward compatibility if the format changes in a later release of the post-processing software 18); the complete ParameterSet, written in binary format; the 3-D coordinates of each output point in the OutputFormat object (the OutputFormat object has a function to produce this information); frequency bands; and the calculated results, stored frame-by-frame on the outer level, and then by variable-band-point.

The CalcBuffer object stores the data in a binary file in a different order than it is needed for the CalcFile object. For the CalcBuffer object, the time frame varies on the inner loop since the data is stored as a set of TimeSeries objects, while in the CalcFile object, the data is stored with time frame on the outer level, to facilitate visualization. To transfer data efficiently from the CalcBuffer to the CalcFile, the CalcBuffer reads through the entire file, storing a large number of frames in a memory buffer, and then provides frame-by-frame access to the data. After the CalcFile is written successfully, the calculation is complete, and the module process exits.

The Implementation of Output Formats will now be described. The OutputFormat object handles all logic for selection of output points. There are many options for this object, because much of the flexibility of the post-processing software 18 comes from using different methods to extract data out of CFD measurement files. For visualization of calculated results, entire fields are needed, but the amount of computational resources needed to perform a calculation can be greatly reduced by cropping the spatial extent to the region of interest. For visualization of a single plane of data, cropping can be used to extract that plane. Subsampling also produces field data, but with many less measurement points, by averaging together adjacent measurement elements to combine them into a single element.

The other options for selection of output points facilitate the generation of many types of graphs. Graphs vs. time or frequency require a small number of output points. A rake or probe can be used to extract data from a large data set to make these types of graphs. Graphs vs. spatial dimensions are particularly important. For example, the power-spectral density value in a range of frequency bands can be plotted vs. X, Y or Z along a line in space or a surface contour (cut by a plane). All of these types of graphs are regularly used in analysis and in technical reports, and the post-processing software 18 provides a highly automated method of producing these graphs.

The OutputFormat object has a set of operations for initialization which implement the user options for setting up output points. Those are described in the following Table 15.

TABLE 15

USER OUTPUT OPTIONS

| | |
|---|---|
| "setMeasFile": | argument is MeasFile object. This operation links a MeasFile with the OutputFormat object, so it can provide all data access to the MeasFile. It also sets the number and location of all the input points, which are used in the determining the output points. |
| "setFieldOutput": | arguments are minimum and maximum coordinates of crop region, and integer representing subsample value. To implement subsampling efficiently, when subsample > 0 a cubic-tree sort algorithm is used to group and sort all of the input points that lie inside the crop bounding box. Each output point in the OutputFormat object is represented by an OutputRegion object, which stores a list of all points which are to be averaged together, along with the sizes of the fluid or surface elements they represent. For Field output with subsample > 0, OutputRegions are used to average together adjacent points to coarsen the grid by a factor equal to the two to the power of s, where s is the subsample value. |
| "setFluidRakeOutput": | arguments are minimum and maximum coordinates of the rake region, integers representing the number of rake points to generate in the X, Y and Z directions, and finally a real number representing the probe size. A probe size of zero represents the option to use only the nearest element with no averaging. To efficiently find all of the input points that are near the |

TABLE 15-continued

USER OUTPUT OPTIONS

| | |
|---|---|
| | specified rake points, again a cubic-tree sort algorithm is used, and OutputRegion objects are used to store the points that are to be averaged for each rake point. |
| "setFluidLinearRakeOutput": | arguments are minimum and maximum coordinates of the rake region, an integer representing the number of rake points to generate along a line between the minimum and maximum coordinates, and a real number representing the probe size. The same process is used as in the previous function. |
| "setFluidProfileOutput": | arguments are coordinates of two end points of the profile line. The same cubic-tree algorithm is used to organize all of the input points between the two specified end points. Then, starting with the first end point, the nearest adjacent point along the direction toward the second end point is determined from the cubic tree, along with all of its neighbors. Interpolation is required to determine the value at a point on the profile line in order to produce a smooth profile. For this, points are added to an OutputRegion for each profile point, but in addition, a weight factor is included based on how close the measurement point is to the profile line. The weighted average produces an interpolated value. |
| "setSurfaceRakeOutput": | arguments are the coordinates of 3 corner points of a parallelogram in space near the surface, 2 integers representing how many rake points to generate in a 2-D grid, projected onto the surface, a real number for the surface probe size, and finally the coordinates of minimum and maximum corners of a crop region to crop the surface before projecting the rake. The 3 corners are used to define a plane, with the normal to the plane being the projection direction (plus or minus). The rake points on the plane are determined by defining a parallelogram with the first side connecting points 1 and 2, and the second side connection points 2 and 3. The specified number of rake points is determined along each side and used to define a grid of points. Then, each point is projected onto the surface (using just a simple search algorithm for the nearest surface element). Cropping the surface can significantly improve the search efficiency if there are a large number of surface elements. |
| "setSurfaceProfileOutput": | arguments are the coordinates of 3 points defining a cut plane, and the coordinates of minimum and maximum corners of a crop region to crop the surface before computing the profile. A simple search is used to determine all surface elements cut by the plane, and their neighbors. Then, values are interpolated to a line where the cut plane intersects the surface element, by creating an OutputRegion with weight values assigned to the points used in the interpolation. |
| "setProbeOutput": | arguments are minimum and maximum coordinates of the crop region. All of the points between the minimum and maximum coordinates specified are included in a single OutputRegion, which averages all points into a single output point. |

After the output points are setup, the function "getTimeSeries" is used to obtain the time signal at each output point. This function retrieves a TimeSeries object for each input point needed to compute the output point, and the results are averaged.

The implementation of FFT options is as follows. The FFTCalculator object is responsible for transforming the time series data into its Fourier transform, using a standard FFT algorithm. It also uses a standard overlapping window approach, and standard "window functions," in which the FFT is performed on smaller segments of the time series, where the segment size is specified as the "window length," and each segment overlaps 50% with the previous one. Then the Fourier transform is averaged over all the windows. If a "windowing function" is used, the signal in each segment is multiplied by a function which tapers to zero at each end. Windowing in this manner smoothes the spectrum as a way of correcting for the short length of the time series in comparison to the real world signal of arbitrarily long length. The FFT algorithm adapts to the signal length, and so is able to process signals with length equal to the product of powers of small numbers (like 2, 3, 5) more efficiently than signals with length with large prime factors.

The FFTCalculator object is set up by specifying the windowing parameters: the window width and the window type. The FFTCalculator provides a function for automatically calculating an efficient window width that is a product of powers of 2, 3 and 5, and is less than some specified value. The FFTCalculator initialization functions are as follows:

TABLE 16

FFTCALCUATOR INITIALIZATION FUNCTIONS

| | |
|---|---|
| "setWindowLength": | integer argument, initializes the FFT to a specified window segment length |
| "setWindowFunction": | integer argument representing the user option "SpectrumWindowType", initializes a vector of weight values using the specified function. |

TABLE 16-continued

FFTCALCUATOR INITIALIZATION FUNCTIONS

| | |
|---|---|
| "getAutoLength": | integer argument representing user option "SpectrumWindowWidthMethod", other than "Custom," and an integer representing the input signal length. Based on the option selected, calculates the window width to use in the FFT. For the "Smoothing optimal" option, the signal length is divided by four, and then the next lowest value that is a product of powers of 2, 3 and 5 is found. |

The Implementation of Frequency Banding options is now described. The FreqBands object determines how to divide the frequency range based on the user input parameter "BandsDivisionsType." This object is initialized using the following functions (Table 17).

TABLE 17

FREQUENCY BANDING OPTIONS

| | |
|---|---|
| "setAutoBandsDivisions": | integer argument representing parameter "BandsDivisionsType" for values other than "Custom", as well as real number arguments for the time step, minimum frequency, and maximum frequency, and an integer argument for the FFT window length. The function sets up the minimum and maximum frequency values for each band, and sets the value for the total number of bands. The bands are divided as follows: For "Single band", a single band is generated between the input values of minimum and maximum frequency. For "Every FFT band," the FFT bandwidth is computed from the input parameters, and constant-spaced bands are created using the bandwidth from the minimum to the maximum values. For the remaining options other than "Custom", proportionally spaced bands are generated. Each option determines a scale factor that is the ratio between the maximum and minimum frequencies for each band. For example, for third-octave, the scale factor is $2^{1/3}$, and is about 1.26. In addition to the scale factor, some starting point is needed for calculating the band divisions. A standard approach is taken to match frequency spectra used in the acoustics community, in that a standard value of 1000 Hz is always used as the center frequency for one of the bands, where the "center frequency" is defined as sqrt(min*max) rather than the mean, according to convention. A simple loop is used to compute the possible bands using the specified scale factor option, and the bands between the minimum and maximum values are included in the spectrum. Also if the minimum range is specified too low, it is corrected so that each band will contain at least one FFT band. |
| "setCustomBandDivisions": | arguments are two vectors containing the minimum and maximum frequencies of each band. The bands are set using the input vectors, and no further checking is performed. |
| "assignModes": | argument is integer representing the window width. After the band divisions have been set, this function is used to assign FFT frequency modes to the bands. After this function is called, then "getModeStart" and "getModeEnd" can be used to return $k_{min}$ and $k_{max}$, which are the start and end frequency mode indices for each band. |

For spectral analysis of fluid data, visualization is very important. The contribution of each frequency band can be represented as an average amplitude in that band for each measurement element in the fluid volume and on the surface. Then, that amplitude can be used to generate a color image, either on a planar cut through the fluid volume or on a shaded 3-D image of the surface object. This helps software users to identify where peak amplitudes are occurring in the flow or on the surface, on a band-by-band basis.

Figure 19:
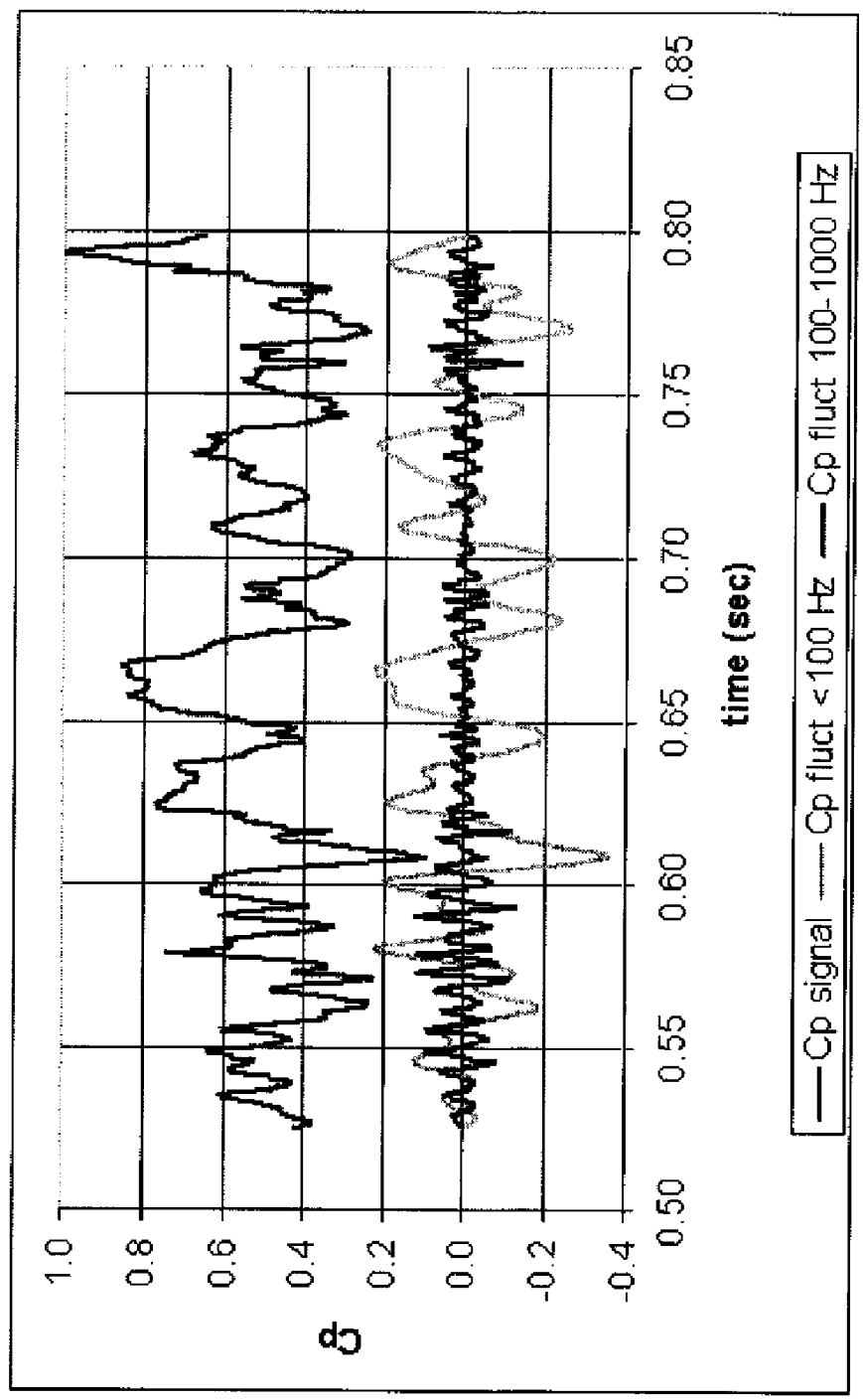
FIG. 19 is an example of a 2-D output graph produced by the post-processing software of the present invention.
Figure 20:
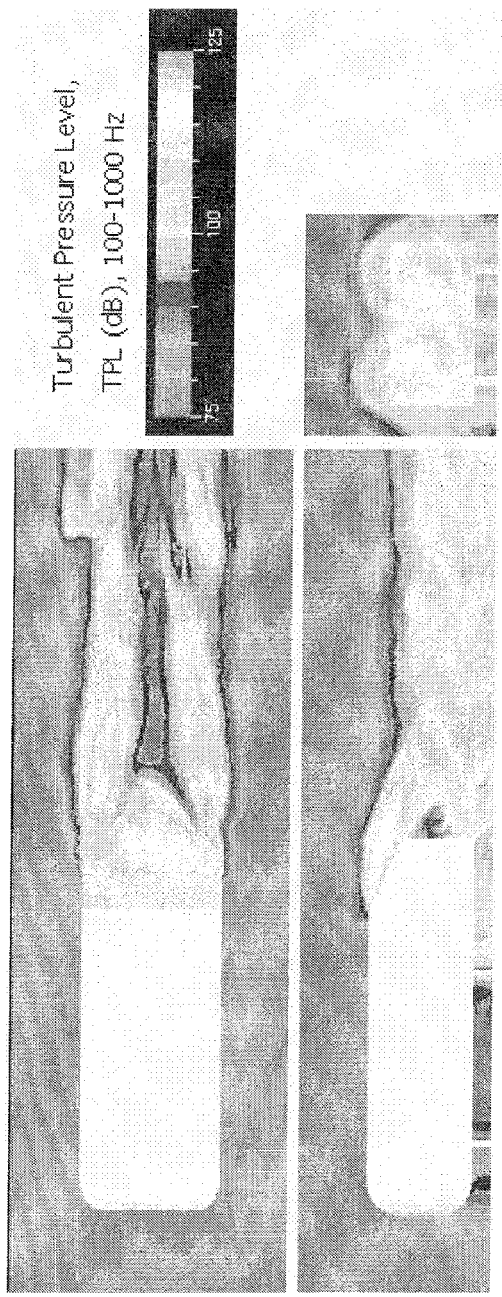
FIG. 20 is an example of graphic flow visualization results produced by the post-processing software of the present invention.

Accordingly, once the frame-by-frame data has been processed as a set of time signals as described above, the results can be output into a format that can be viewed. The simplest method of viewing this data is in the form of a graph. Computed quantities can be graphed versus time, frequency, or spatial location. Graphs are used to quantify and compare levels of specific quantities. The graphing module uses known techniques to allow the user to read the desired data from a calculation file and generate a graph of the data (for example, a two-dimensional X-Y graph). An example of such a graph 126 is depicted in FIG. 19. The graph 126 is not displayed immediately but is stored in a custom view file which contains user parameters and data representing a graph. A separate graph viewer component 28 (see FIG. 3) is included in the post-processing software 18 for viewing these files, as described below.

The software includes a graph viewer module 28 for the viewing of graphs created by the graphing module described above. The graph viewer module 28 is available both as an integrated component available from the project manager menu, and as a stand-alone application which can be activated, for example, by "double-clicking" on a view file. The graph viewer module 28 allows printing, graphical copy and paste into other programs, and export of the graph image to various image formats.

The export modules 32 (described above) read data from calculation files and use it to create new file types. The first file type that is supported is text—the user can specify what data to extract, and it is written to a text file using columnar output. Secondly, 3-D data sets can be written to file formats supported by third-party commercial CFD packages for visualization of data. Preferably, this is done by exporting the (output) data back into the format used for measurement files, however any desired data set format may be used. Since jobs representing view and export operations can be queued along with calculations, the user can set up an entire analysis project starting with measurement files as input and resulting in a set of graphs and exported visualization files. This model allows the software to extend the types of output to, for example, image and movie files.

Using the export files created by the post-processing software 18, visualization software of a known type can provide methods of examining the data using color maps, lines and vectors, 3-D surfaces, etc. These images can be computed for each measurement frame and combined to form an animation using known software techniques.

Figure 21:
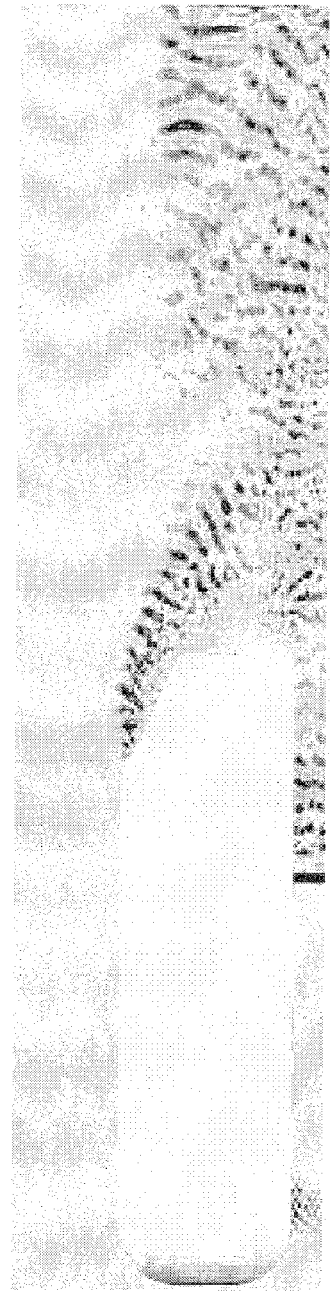
FIG. 21 is an example of graphic flow visualization results produced by the post-processing software of the present invention using filtering techniques.

Examples of graphical flow visualizations created from output of the post-processing software are shown in FIGS. 23 and 24. FIG. 23 is a set of three 2D views (top, side, and rear) of a flow pattern around a model. These views may be displayed on a computer monitor of a known type. The turbulent pressure level in the flow is represented as varying shades of gray or as different colors in a known fashion. FIG. 21 illustrates a similar flow visualization in which the filtering techniques (described above) have been applied to the output. In this case, the fluctuation pressure coefficient Cp for a frequency band spanning 1–10 KHz is illustrated. The periodic, repeating flow features can clearly be seen as the spaced-apart dark and light areas in the wake of the model.

Animations are also useful in conjunction with spectral analysis. Isolating contributions from each frequency band using an FFT, the flow features in that band can be reconstructed separate from features in other frequency bands. This procedure is called a "band-pass filter". This type of filter shows the fluctuations occurring in each frequency band at a series of time levels, and color image visualization can be used to create an animation sequence. For example, turbulent flow structures can produce acoustic waves when they impinge on a surface. Spectral analysis of the pressure field in the turbulent flow region surrounding the surface can be used to show the frequency content of these turbulent structures. When visualizing these results, a single image could convey the amplitude of the turbulent structures in a particular frequency band, for example 100–200 Hz. However, a band-pass filter in the 100–200 Hz frequency band could produce an animation of pressure in that frequency band. This animation would actually show the generation and propagation of turbulent structures (such as those shown in FIG. 21) and would help identify the spatial size of those structures, the direction of propagation, and the mechanism for producing acoustic waves—all of which would be lost in the visualization of amplitude alone.

The foregoing has described a method and software for analysis of turbulent fluid flows. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method for analyzing a turbulent fluid flow field, comprising the steps of:
    creating a mathematical model of a physical object by storing geometric data representing at least one surface of said physical object, said surface being divided into a mesh of individual surface elements;
    simulating a flow field around said model, wherein said flow field is at least partially turbulent;
    generating time series flow data representative of said flow field, wherein said flow data comprises surface measurement elements and volume measurement elements, and each of said surface measurement elements represents a plurality of said surface elements; and
    identifying repeating turbulent flow patterns which cause aerodynamic noise in said flow data by:
        selecting at least one frequency range of interest;
        filtering the flow data based on said frequency range; and
        observing coherent flow structure in the filtered data.

2. The method of claim 1 wherein said step of simulating said flow field comprises using a computational fluid dynamics software program to generate said flow data based upon preselected flow conditions.

3. The method of claim 2 in which said flow data contains a representation of time-dependent turbulent eddies.

4. The method of claim 1 further comprising displaying said repeating flow patterns in a human-readable format.

5. The method of claim 4 wherein said human-readable format comprises a sequence of images representing said flow data at different time values.

6. A method for analyzing a turbulent fluid flow field, comprising the steps of:
- creating a mathematical model of a physical object;
- simulating a flow field around said model, wherein said flow field is at least partially turbulent;
- generating time series flow data representative of said flow field; and
- identifying repeating turbulent flow patterns in said flow data by:
  - selecting at least one frequency range of interest;
  - filtering the flow data based on said frequency range; and
  - observing coherent flow structure in the filtered data;
- wherein the step of filtering the flow data comprises:
  - computing a Fourier transform of said flow data to produce frequency domain data;
  - applying a selected filter to said frequency domain data, based on the selected frequency range; and
  - computing the inverse Fourier transform of the frequency domain data to produce output data at a range of time values, said output data containing coherent flow structure.

7. A method for analyzing a turbulent fluid flow field, comprising the steps of:
- creating a mathematical model of a physical object;
- simulating a flow field around said model, wherein said flow field is at least partially turbulent;
- generating time series flow data representative of said flow field; and
- identifying repeating turbulent flow patterns in said flow data by:
  - selecting at least one frequency range of interest;
  - filtering the flow data based on said frequency range; and
  - observing coherent flow structure in the filtered data,
- wherein the above-described steps are implemented by a software program including:
  - a spectral analysis module for performing calculations on said flow data;
  - a job server module adapted to maintain a list of pending calculation tasks and to forward said tasks to said spectral analysis module; and
  - a project manager module operable to receive user commands and transmit instructions to said job server module.

8. A computer-readable medium including program instructions executing on a computer for analyzing a simulated fluid flow field, the program instructions performing the steps of:
- reading data comprising a model of a physical object, wherein said model comprises geometric data representing at least one surface of said physical object, said surface being divided into a plurality of individual surface elements;
- reading flow data representative of a flow field which is at least partially turbulent over said plurality of surface elements, wherein said flow data is formatted as a plurality of surface measurement elements and volume measurement elements, each of said surface measurement elements representing a plurality of said surface and
- identifying repeating turbulent flow patterns in said flow data by:
  - filtering the flow data based on a selected frequency range; and
  - displaying said filtered data, whereby coherent flow structure may be observed therein.

9. The computer-readable medium of claim 8 wherein said flow data represents the effect of said surface on said simulated flow field.

10. The computer-readable medium of claim 8 in which said flow data contains a representation of time-dependent turbulent eddies.

11. A computer-readable medium including program instructions executing on a computer for analyzing a fluid flow field, the program instructions performing the steps of:
- reading data comprising a model of a physical object;
- reading flow data representative of a flow field which is at least partially turbulent over said plurality of surface elements;
- identifying repeating turbulent flow patterns in said flow data by:
  - filtering the flow data based on a selected frequency range; and
  - displaying said filtered data, whereby coherent flow structure may be observed therein;
- wherein the step of identifying said repeating flow patterns comprises:
  - selecting at least one frequency range of interest;
  - computing a Fourier transform of said flow data to produce frequency domain data;
  - applying a selected filter to said frequency domain data, based on the selected frequency range; and
  - computing the inverse Fourier transform of the frequency domain data to produce output data at a range of time values, said output data containing coherent flow structure.

12. A computer-readable medium including program instructions executing on a computer for analyzing a fluid flow field, the program instructions performing the steps of:
- reading data comprising a model of a physical object;
- reading flow data representative of a flow field which is at least partially turbulent over said plurality of surface elements;
- identifying repeating turbulent flow patterns in said flow data by:
  - filtering the flow data based on a selected frequency range; and
  - displaying said filtered data, whereby coherent flow structure may be observed therein;
- wherein said program instructions include:
  - a spectral analysis module for performing calculations on said flow data;
  - a job server module adapted to maintain a list of pending calculation tasks and to forward said tasks to said spectral analysis module; and
  - a project manager module operable to receive user commands and transmit instructions to said job server module.

* * * * *